Inventor:
Edward W. Miller,
by Wright, Brown, Quinby they
Attys

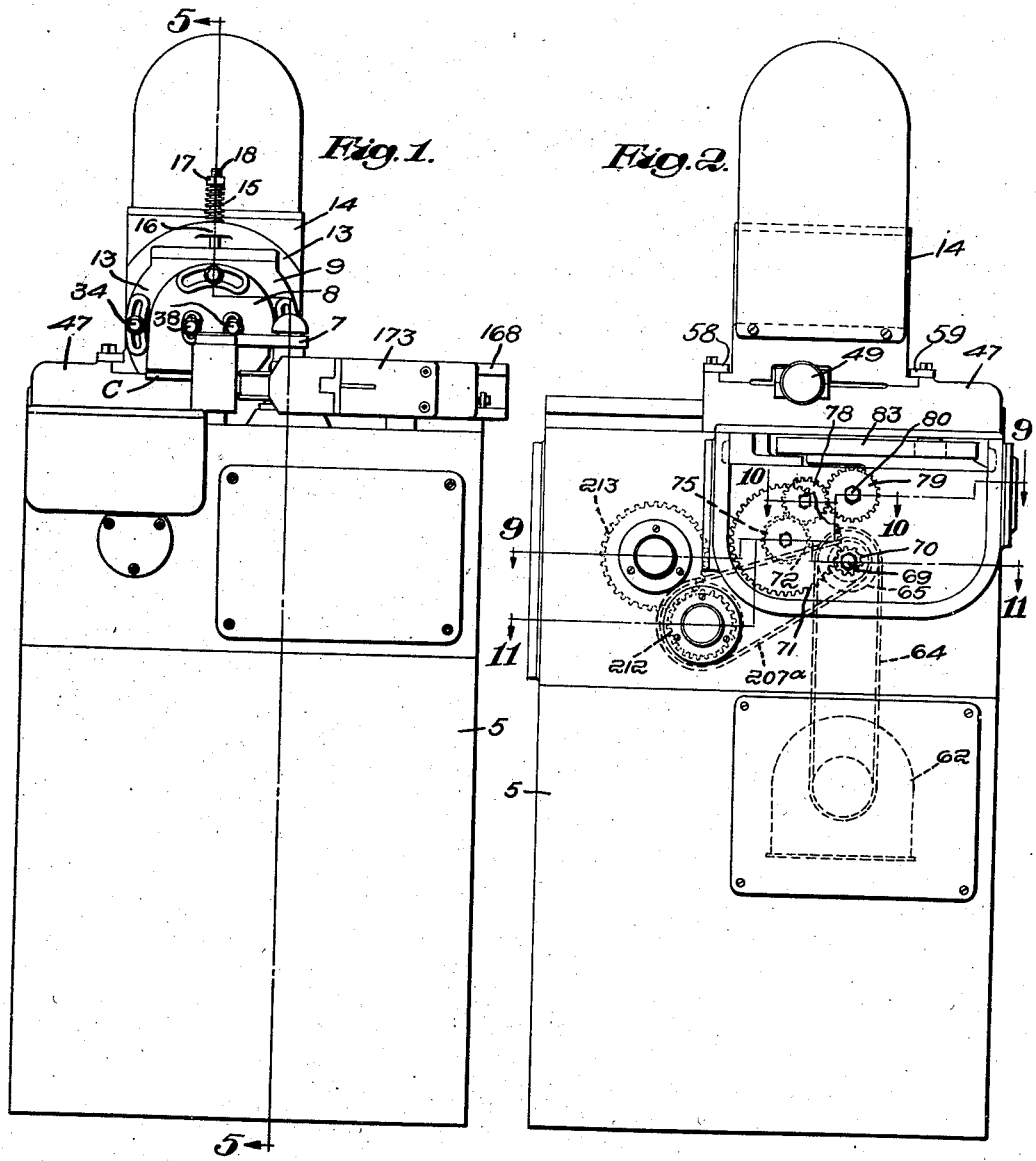

March 27, 1945.　　　　　E. W. MILLER　　　　　2,372,596
MACHINE FOR GENERATING FINE PITCH AND OTHER GEARS
Filed July 14, 1939　　　15 Sheets-Sheet 4

Inventor:
Edward W. Miller
by Wright, Brown, Quinby Ching
Attys

March 27, 1945.   E. W. MILLER   2,372,596
MACHINE FOR GENERATING FINE PITCH AND OTHER GEARS
Filed July 14, 1939   15 Sheets-Sheet 5

Inventor:
Edward W. Miller,
by Wright, Brown, Quinby & May
Attys.

March 27, 1945. E. W. MILLER 2,372,596
MACHINE FOR GENERATING FINE PITCH AND OTHER GEARS
Filed July 14, 1939   15 Sheets-Sheet 7

Inventor:
Edward W. Miller

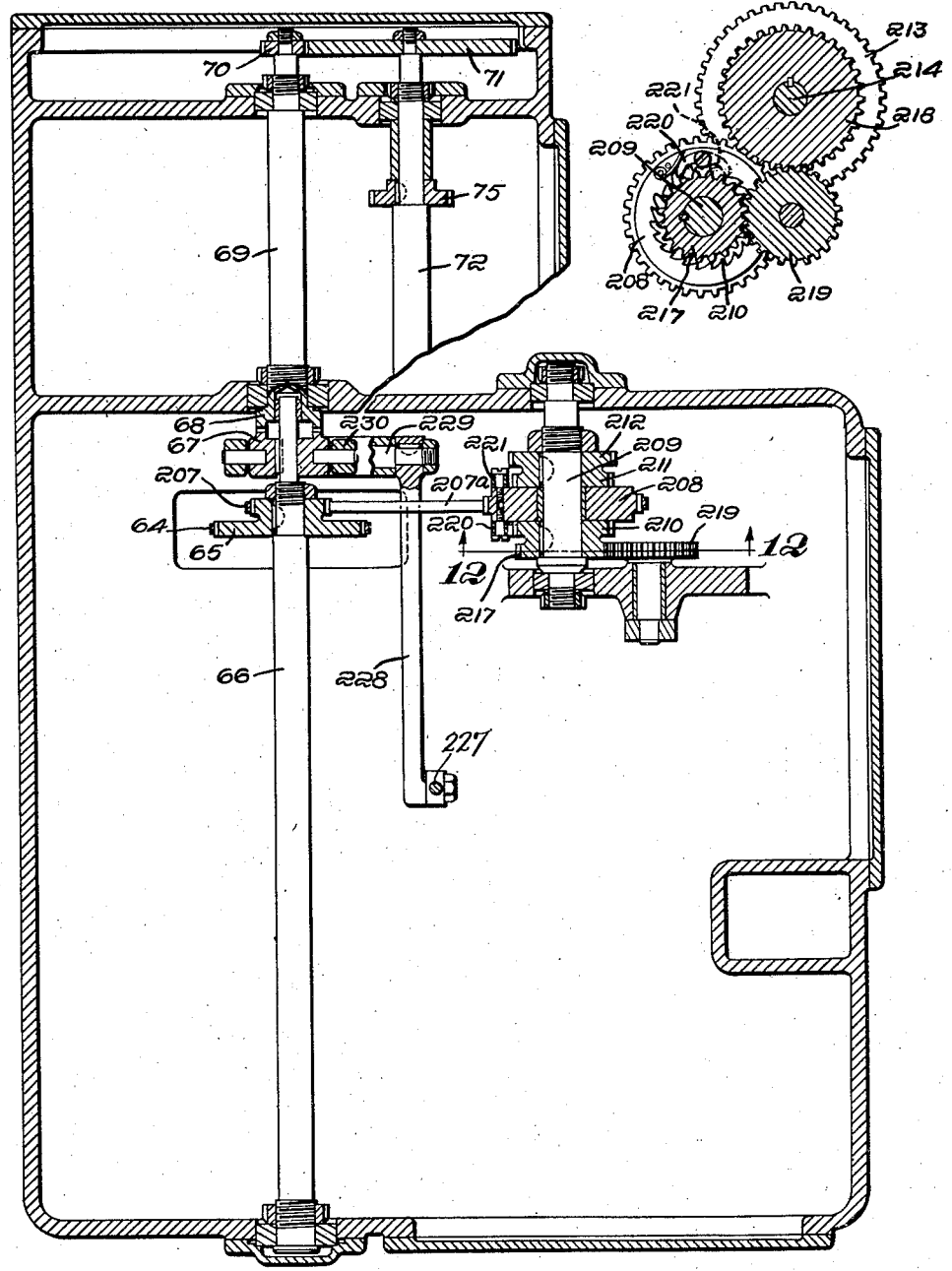

March 27, 1945. E. W. MILLER 2,372,596
MACHINE FOR GENERATING FINE PITCH AND OTHER GEARS
Filed July 14, 1939 15 Sheets-Sheet 9
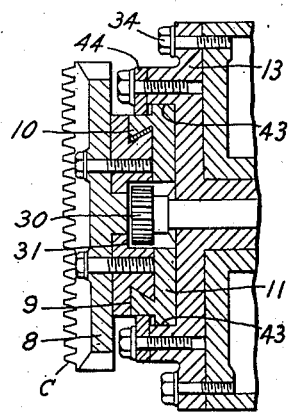
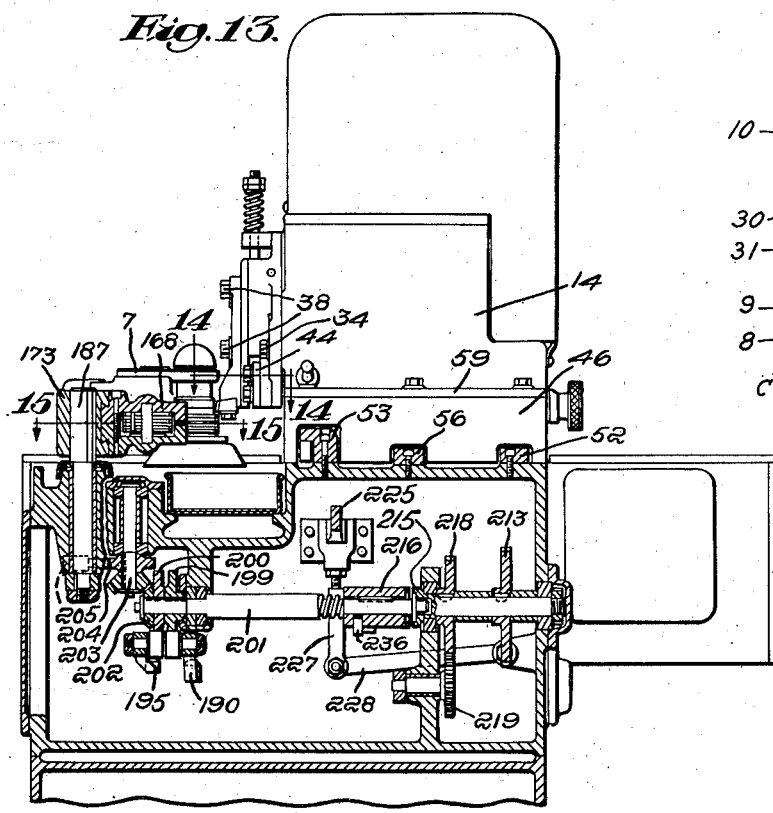
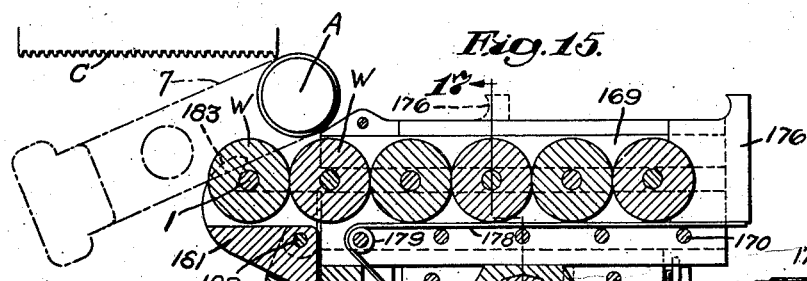
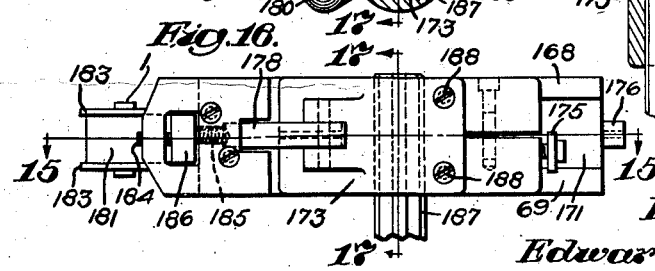
Inventor:
Edward W. Miller

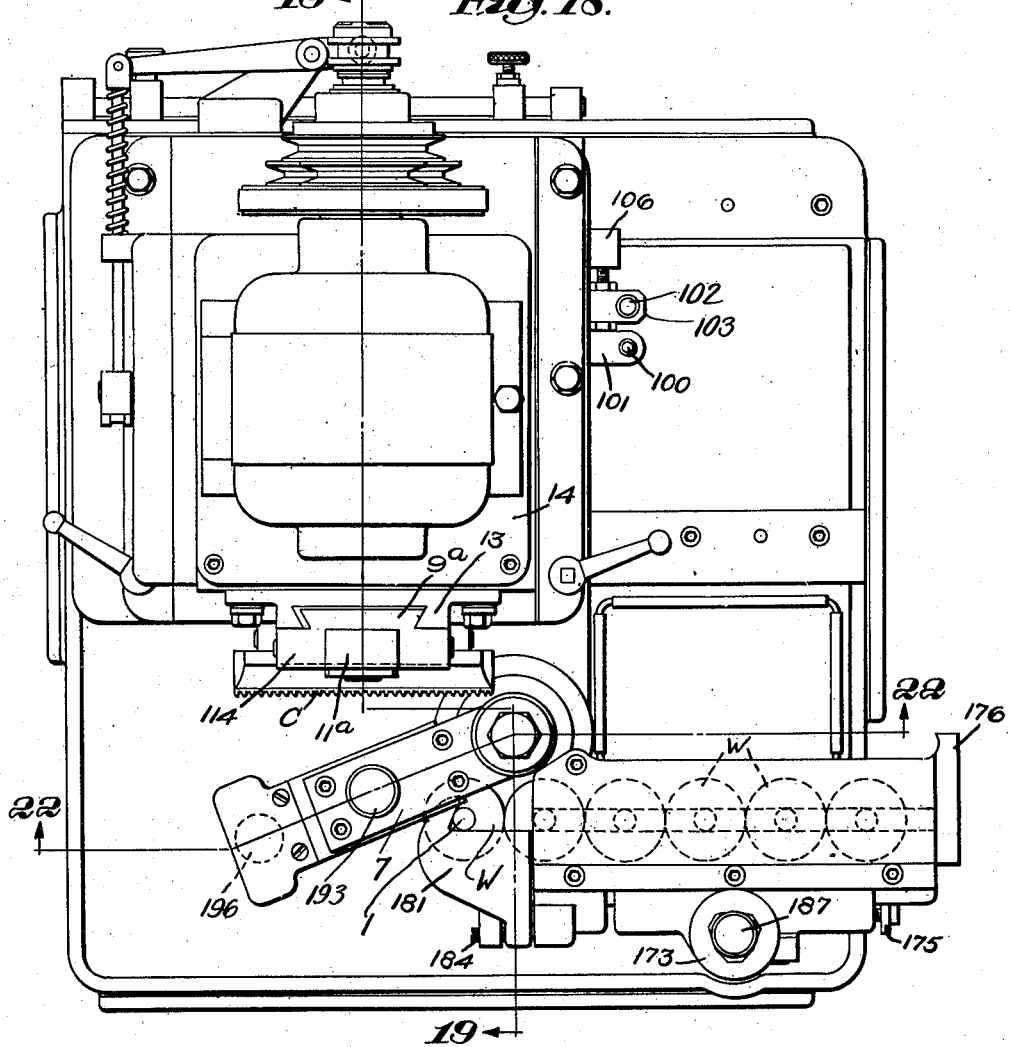

March 27, 1945. E. W. MILLER 2,372,596
MACHINE FOR GENERATING FINE PITCH AND OTHER GEARS
Filed July 14, 1939 15 Sheets-Sheet 12

Inventor:
Edward W. Miller,
by Wright, Brown, Quinby
  Huey
    Attys

March 27, 1945. E. W. MILLER 2,372,596
MACHINE FOR GENERATING FINE PITCH AND OTHER GEARS
Filed July 14, 1939 15 Sheets-Sheet 13
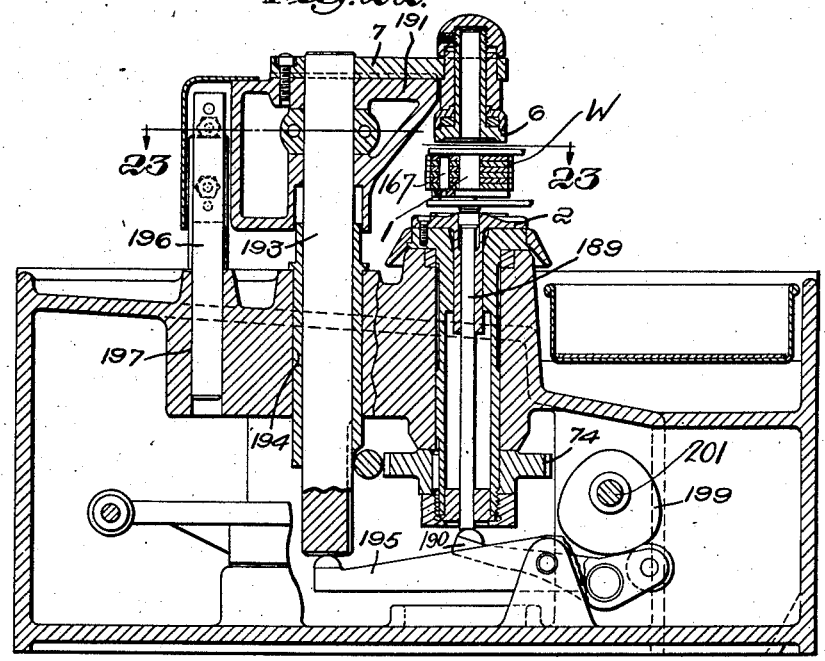
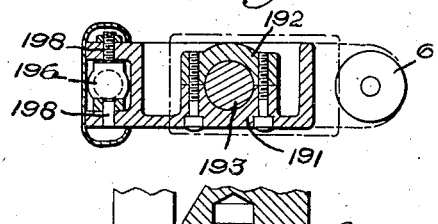
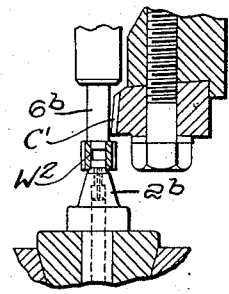
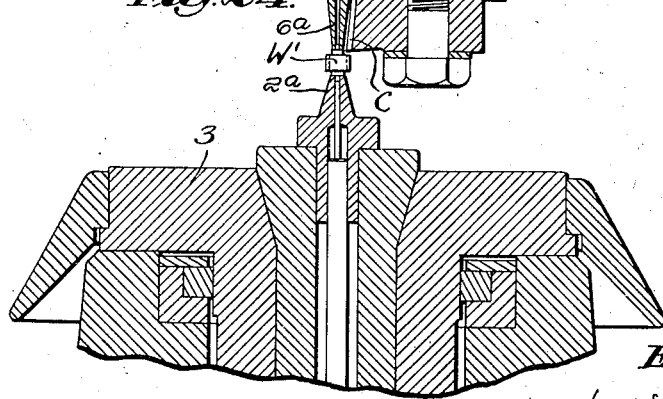
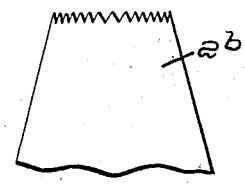
Inventor:
Edward W. Miller, March 27, 1945.　　　　E. W. MILLER　　　　2,372,596
MACHINE FOR GENERATING FINE PITCH AND OTHER GEARS
Filed July 14, 1939　　15 Sheets-Sheet 14

Inventor:
Edward W. Miller,
by Wright, Brown, Quinby & May
Attys

March 27, 1945.                 E. W. MILLER                    2,372,596
            MACHINE FOR GENERATING FINE PITCH AND OTHER GEARS
                  Filed July 14, 1939        15 Sheets-Sheet 15
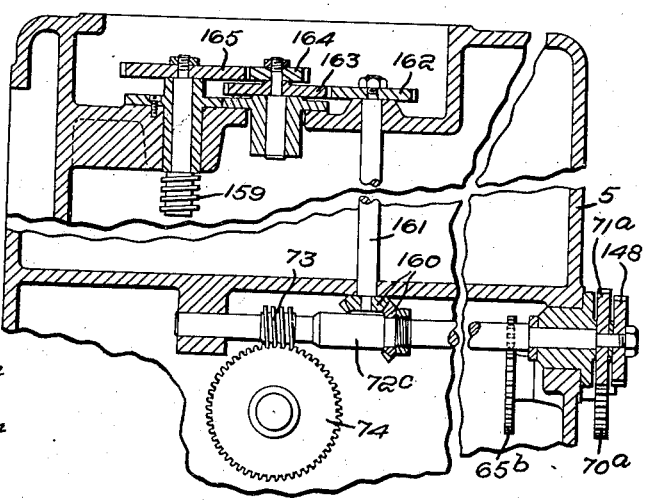
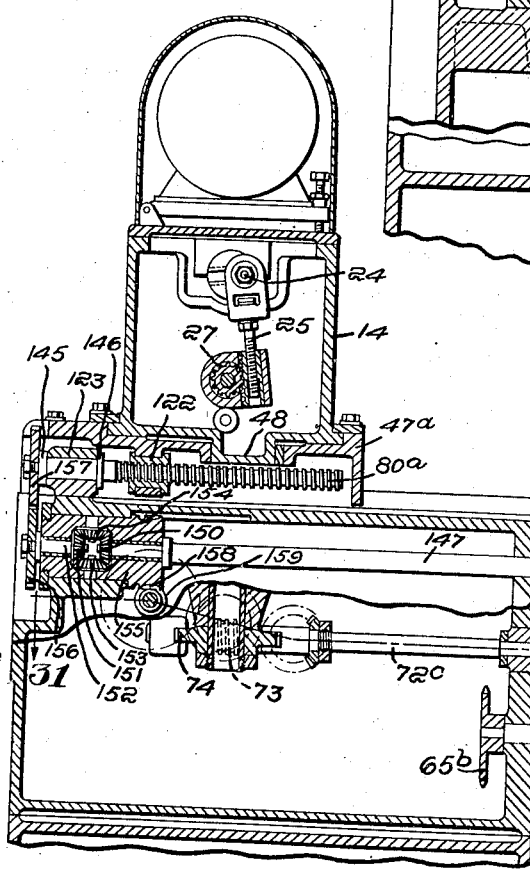

Patented Mar. 27, 1945

2,372,596

UNITED STATES PATENT OFFICE 2,372,596

MACHINE FOR GENERATING FINE PITCH AND OTHER GEARS

Edward W. Miller, Springfield, Vt., assignor to The Fellows Gear Shaper Company, Springfield, Vt., a corporation of Vermont Application July 14, 1939, Serial No. 284,416

42 Claims. (Cl. 90—8)

The present invention is principally concerned with machines for cutting by the molding generating process gears of very fine pitches. However, many of the principles of the invention are applicable to the cutting of coarse pitch gears, cams and other articles of similar or analogous character, also, wherefore the protection which I seek is not to be construed as limited to the production of fine pitch gears only. But the main object I have sought and accomplished is to enable gears of extremely fine pitches to be generated and cut within unusually narrow limits of accuracy. Gears of the character referred to are the pinions and gears of watches, and those which are used in measuring instruments, motion picture cameras and projectors, and other mechanisms employing small gears and in which the greatest possible accuracy is highly desirable. Such gears have not been made with the desired accuracy of tooth forms and dimensions heretofore because of the limitations of the machines and equipment available up to this time for cutting them.

In accomplishing the object set forth I have devised a cutter in the form of a rack with teeth equal to, or exceeding in number, the number of teeth to be cut in a given work piece, or a multiple of that number; such cutter having cutting edges at one end of its teeth and the sides of the teeth being relieved for cutting clearance. With such cutter I have combined means for reciprocating it in the direction of the length of its teeth (which is transverse to the length of the cutter as a whole), for performing the cutting action, and means for giving it a progressive generating travel lengthwise of the rack as a whole while the work is rotated at equal linear pitch line velocity. I have further provided novel means in a number of different embodiments for exactly and accurately correlating the progressive traverse of the cutter with the rotation of the work piece, to the end that the teeth cut in the latter will have the correct spacing and thickness. Another feature of the invention consists in provisions for adjusting the machine, with substitution of different cutters, for producing either spur gear teeth or helical teeth of various helix angles. Still another object of the invention is to shorten the time consumed in changing the work, which I have accomplished by providing a magazine adapted to hold a plurality of blank work pieces, combined with mechanism for effecting an automatic delivery of blanks from the magazine to the cutting position on the completion of each work piece.

These and other features of the inventions are fully described and explained in the following specification in connection with drawings which illustrate some of the forms in which the principles of the invention may be embodied.

In the drawings referred to,

Fig. 1 is a front elevation, Fig. 2 a rear elevation, Fig. 3 a plan view, and Fig. 4 a side elevation as seen from the right of Figs. 1 and 3, of a complete machine containing one embodiment of the invention;

Fig. 11 is a horizontal section taken on line 11—11 of Figs. 2 and 7;

Fig. 12 is a detail vertical section taken on line 12—12 of Figs. 9 and 11;

Fig. 13 is a vertical front to rear section taken on line 13—13 of Figs. 3, 6, 7 and 9;

Fig. 14 is a detail horizontal section taken on line 14—14 of Fig. 13 and drawn on a larger scale;

Fig. 15 is a horizontal section of one form of the magazine for the blank work pieces taken on line 15—15 of Figs. 13 and 16;

Fig. 16 is a front elevation of the magazine shown in Fig. 15;

Fig. 17 is a cross section of the magazine and accessory parts taken on line 17—17 of Figs. 15 and 16;

Fig. 18 is a plan view of a form of the machine containing other embodiments of certain features of the invention;

Figure 19:
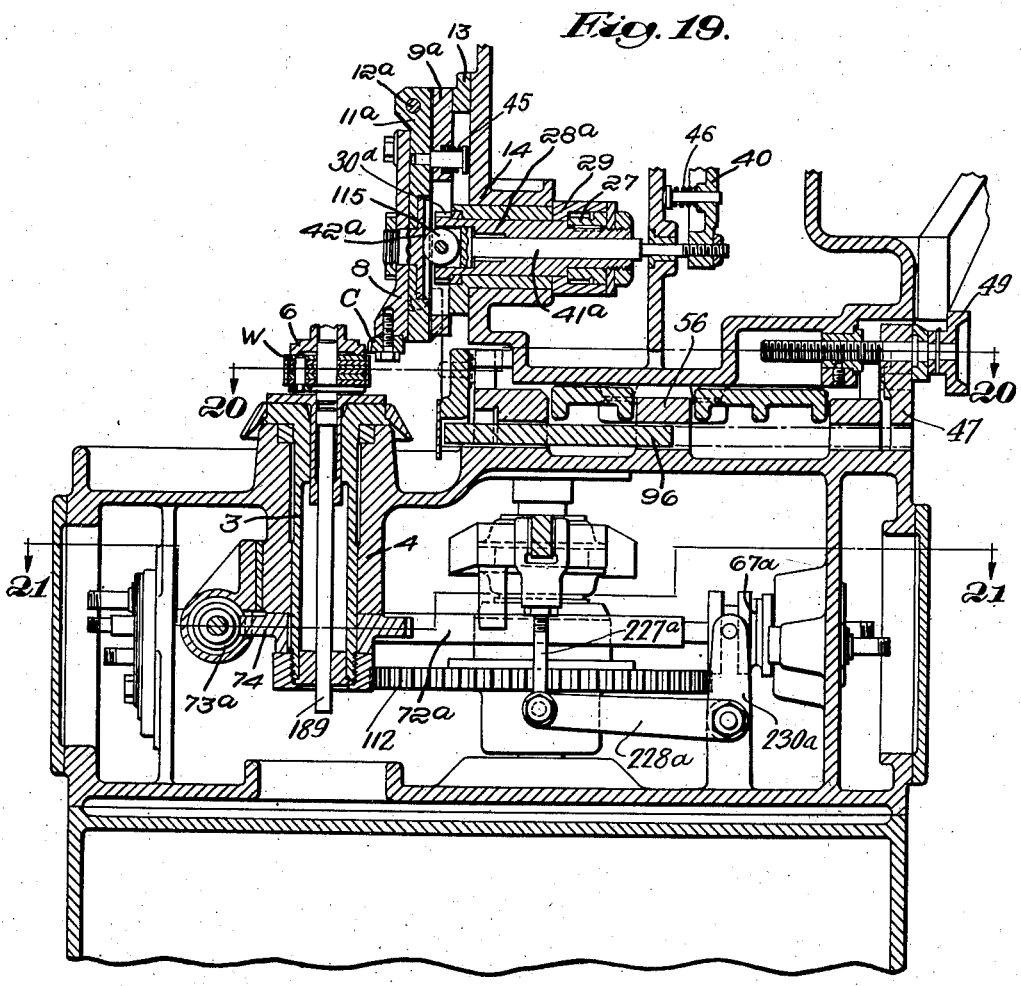
Fig. 19 is a vertical section taken on line 19—19 of Fig. 18.
Figure 20:
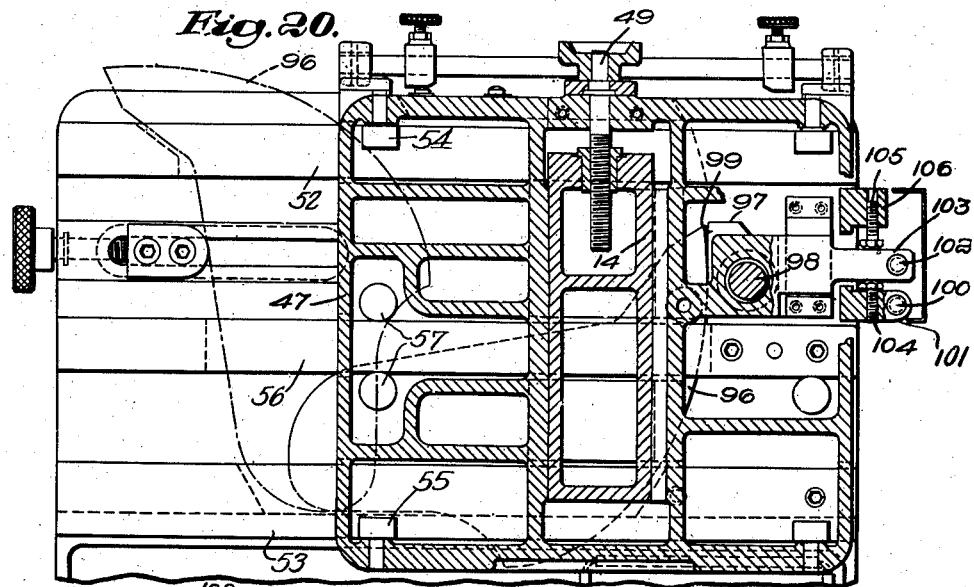
Figure 21:
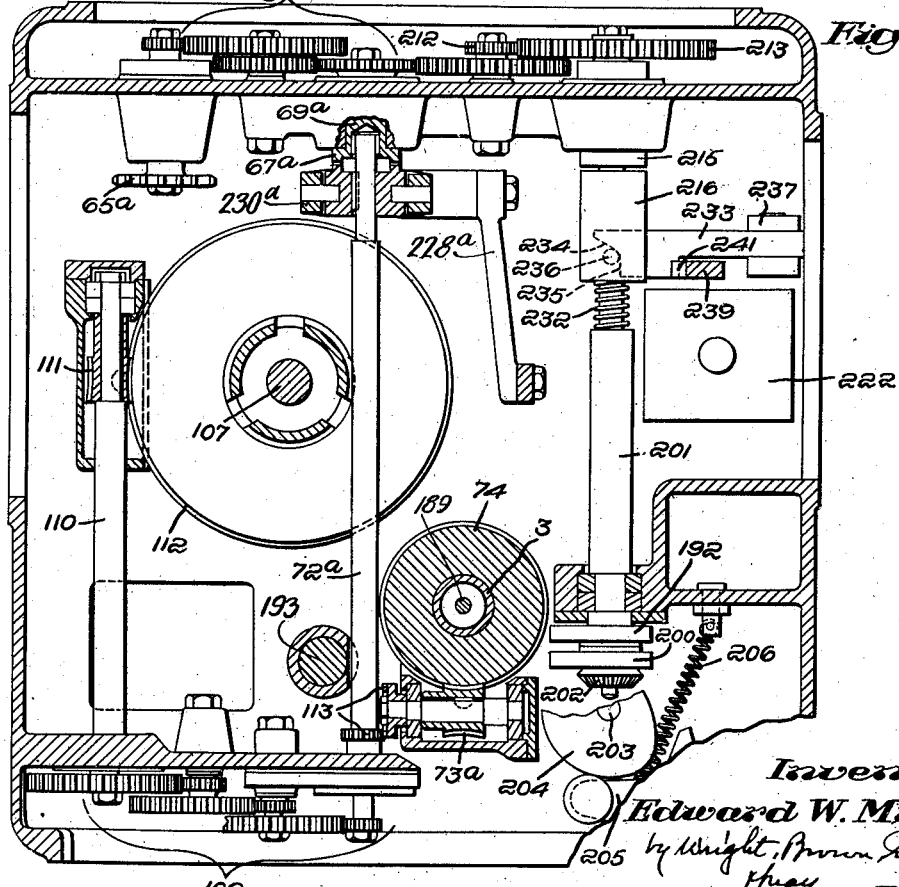
Figure 27:
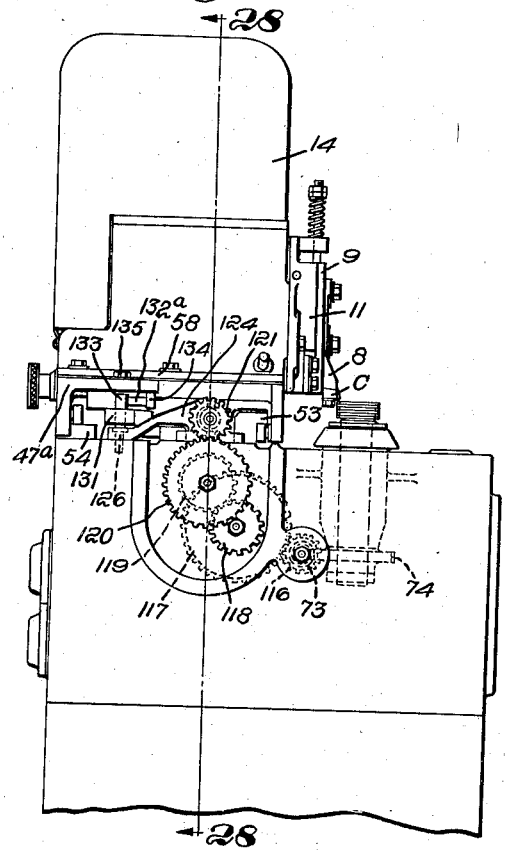
Figure 28:
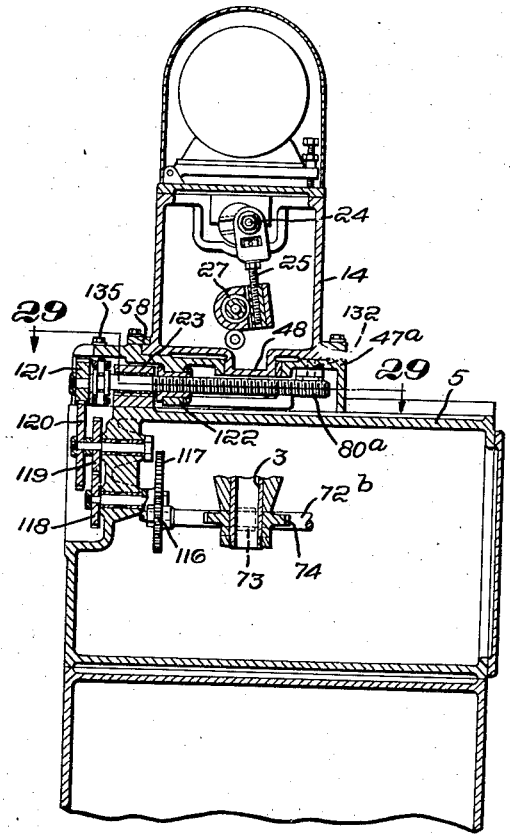
Figure 29:
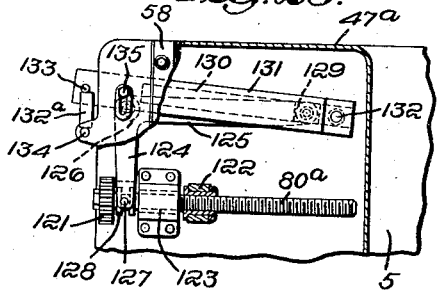

Figs. 20 and 21 are horizontal sections on lines 20—20 and 21—21 respectively of Fig. 19;

Fig. 22 is a vertical section on line 22—22 of Fig. 18;

Fig. 23 is a detail horizontal section on line 23—23 of Fig. 22;

Figs. 24 and 25 are fragmentary views showing different forms of work clamping means adapted to be substituted for the work clamping means shown in certain of the preceding figures;

Fig. 26 is an enlarged detail of the work adapter shown in Fig. 25;

Fig. 27 is a side elevation of a form of the machine showing a variation of means for regulating the generating traverse of the cutting tool;

Fig. 28 is a vertical section on line 28—28 of Fig. 27;

Fig. 29 is a horizontal section on line 29—29 of Fig. 28;

Fig. 30 is a section similar to Fig. 28 showing still another variation of means for controlling the traverse of the cutter;

Fig. 31 is a horizontal section on line 31—31 of Fig. 30.

Like reference characters designate the same parts wherever they occur in all the figures.

Figure 3:
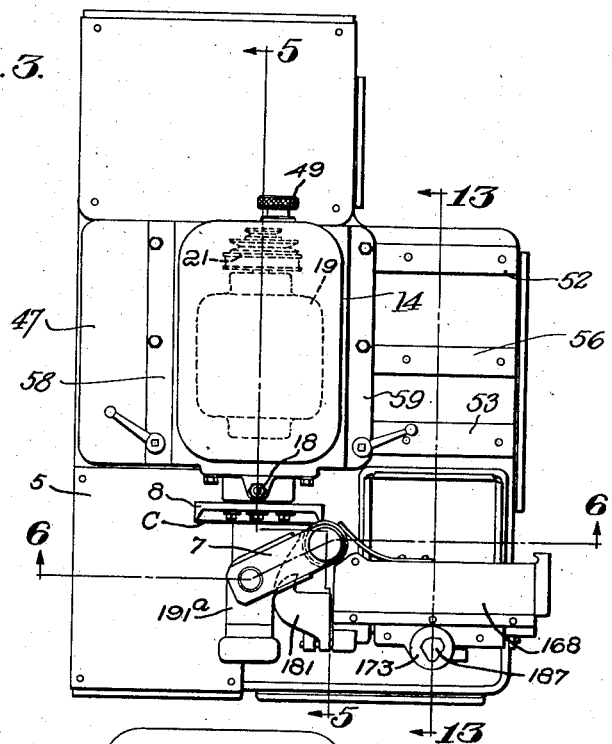
Figure 4:
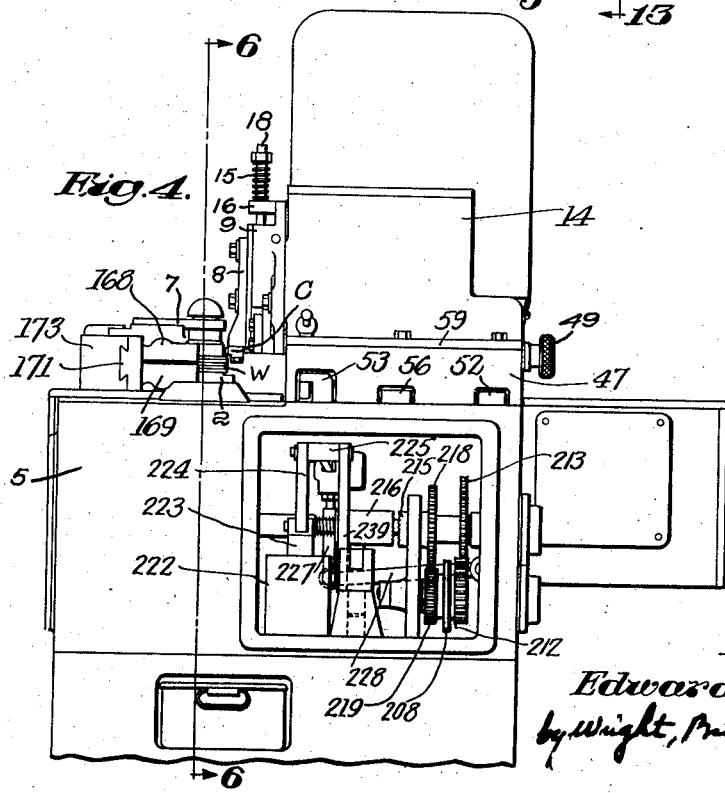
Figure 5:
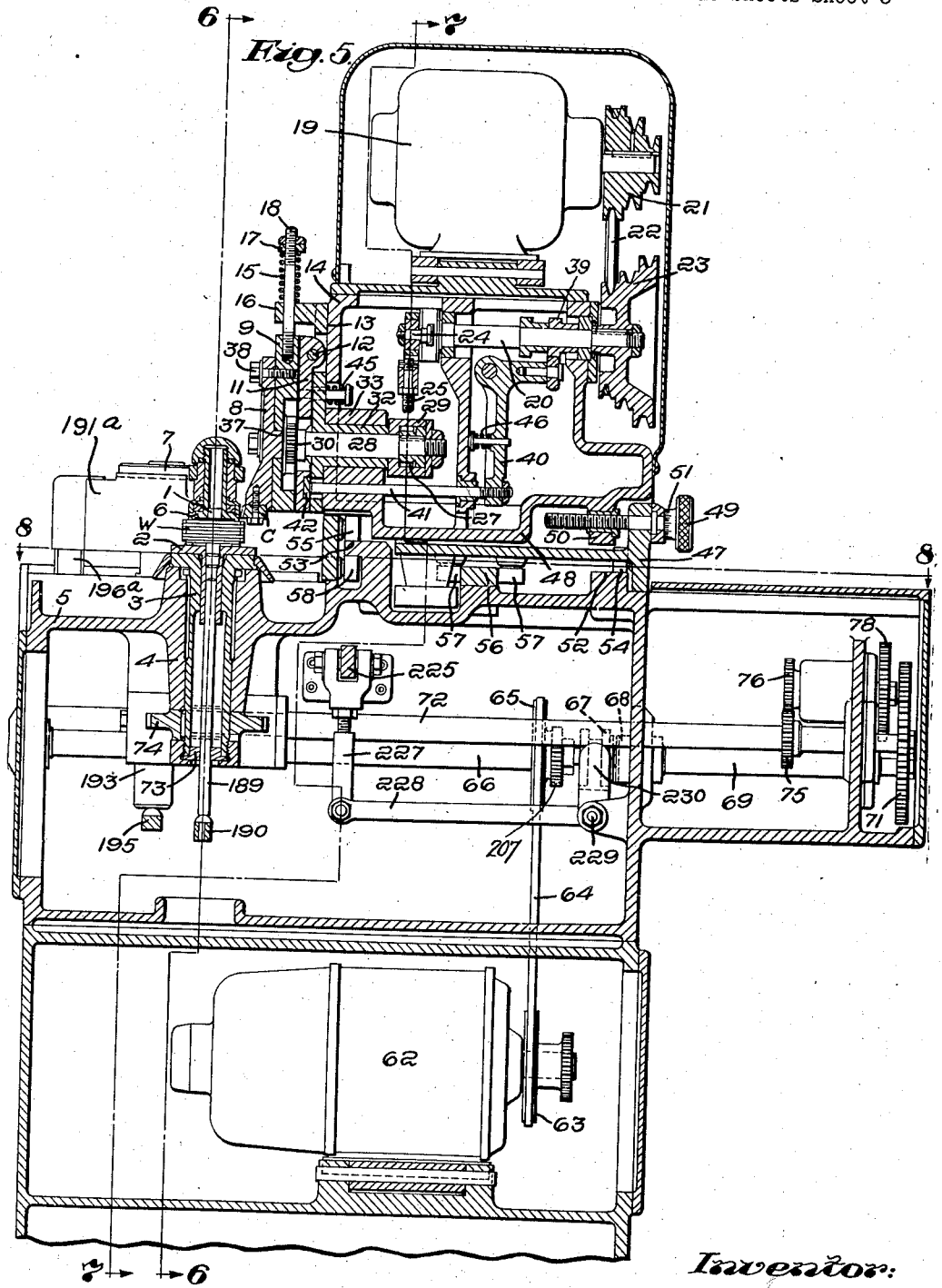
Fig. 5 is a vertical section of the machine taken on line 5—5 of Figs. 1, 3 and 7 and shown on a larger scale.
Figure 6:
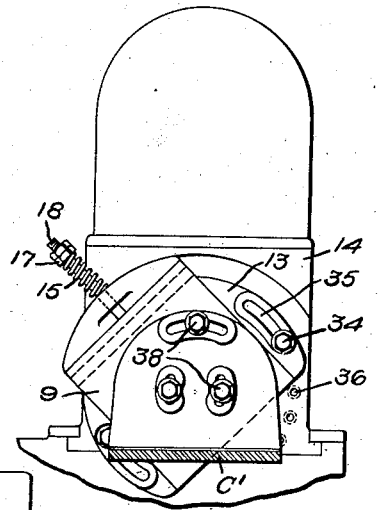
Fig. 6 is a vertical cross section and partial elevation of the machine as taken on line 6—6 of Figs. 3, 4 and 5.

Referring first to Figs. 5 and 6, the work is shown at W and the cutter at C. In this instance the work is a series of disks mounted on a flanged arbor 1, but may be a single solid gear blank, as will be later explained. The arbor is supported by an adapter 2 held by the upper end of a tubular work spindle 3 which rotates in a bearing sleeve 4 in the machine base 5. The upper end of the arbor is centered, and the work is clamped against the adapter, by an arbor support 6 having a rotative bearing in an arm 7 mounted on the base and operated to clamp and release the work in a manner later described.

The cutter is a bar of an alloy steel suitable for metal cutting tools having cutting teeth in a line along one edge. Such teeth are similar to rack teeth in their alinement and outlines at the cutting end, but their sides are tapered inward from the cutting end to avoid rubbing in the course of their cutting strokes. The cutter is detachably secured by bolts to a cutter head 8, which in turn is secured to a slide 9 mounted to slide in an undercut guideway 10 (see Fig. 14) in the forward side of a shiftable holder 11 which is connected by means of a pivot rod 12 to a plate 13, which for the purposes of this description may be called the cutter head base, secured to the front wall of the cutter carriage 14.

Where, as in this illustration, the work is mounted with its axis vertical, the cutter is reciprocated up and down in a vertical plane, i. e., a plane parallel to said axis, wherein its path may be either vertical or inclined, (which path, in either case, is transverse to the length of the cutter bar), and the guideway 10 is arranged to permit such movement. The pivot 12 is perpendicular, or at least transverse, to the direction of the guideway and is provided to permit backing off of the cutter from the work on the return strokes. A spring 15 between a bracket 16 on the cutter head base and an abutment 17 on a rod 18 secured to the slide 9 counterbalances the weight of the slide.

Reciprocating movement is imparted to the cutter head slide by the following means. A motor 19, herein called the cutter driver, drives a crank shaft 20 through a belt and pulley drive 21, 22, 23. A crank pin 24 on the end of shaft 20 (see also Fig. 7) is coupled to a connecting rod 25 having a screw threaded part engaged adjustably with a rack 26. Said rack meshes with a gear 27 on a rock shaft 28 and fits slidingly in a guide 29 having pivotal engagement with the rock shaft. Shaft 28 has on its forward end a gear 30 projecting into a recess in the rear side of the slide 9 and meshing with a rack 31 secured to the slide in a line parallel to the guideway 10. Hence as the crank pin rotates, the gear 30 is oscillated and the slide carrying the cutter is reciprocated in the path established by the guideway.

Figure 6A:
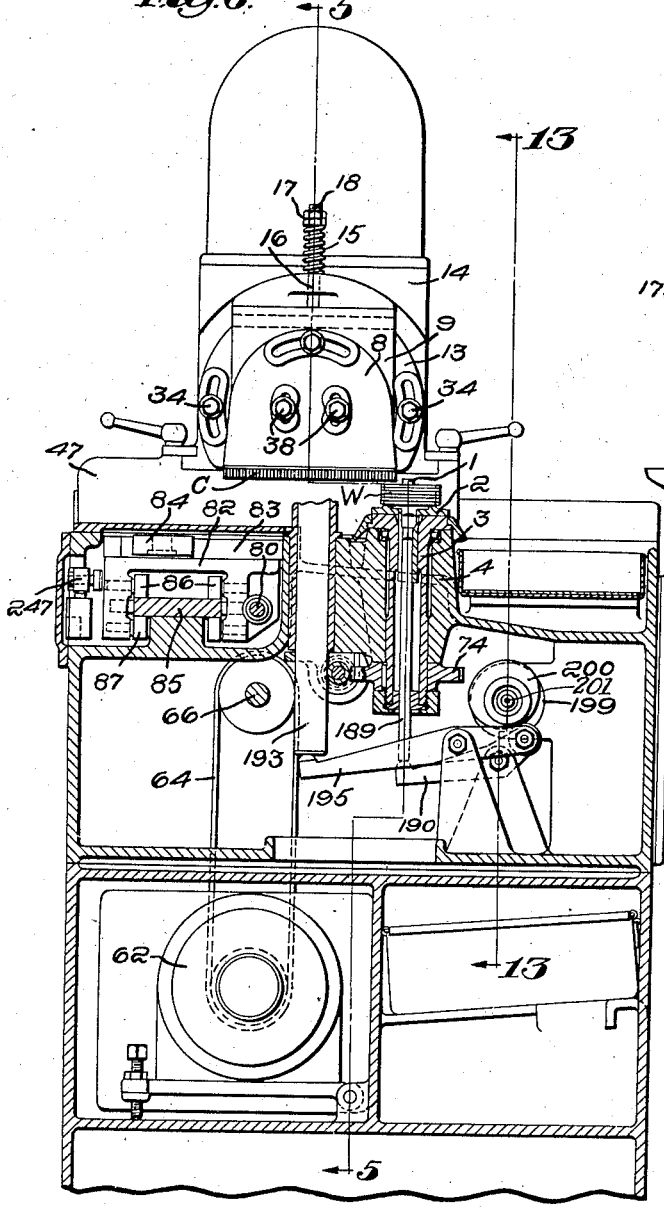
Fig. 6a is a fragmentary elevation of the cutter head of this machine showing the adjustment for cutting helical gears of approximately 45° helix angle.

Such path is parallel to the axis of the work piece in cutting spur gears. But it may be inclined at any angle, for which purpose the base 13 is connected pivotally to the carriage 14 to turn about the axis of rock shaft 28, having a sleeve portion 32 which fits a bearing 33 in the carriage and provides a bearing for rock shaft 28. Bolts 34 (Figs. 6 and 6a) pass through coaxial arcuate slots 35 in the marginal part of the base 13 into any one of a number of holes 36 in the face of the carriage located at equal distances from the axis of bearing 33, permitting the base and guide to be tilted. The cutter head 8 is likewise adjustable with respect to the slide which carries it, having a centering boss 37 (Fig. 5) which fits a recess in the slide and being secured by bolts 38 entering selected holes in the slide through coaxial arcuate slots in the head. Tilting of the slide enables the cutter to be reciprocated in a path conforming to the helix angle of any helical gear, and the drive through the gear 30 and rack 31 is equally effective regardless of the inclination to which the slide is tilted. The cutter head may be tilted at an equal and opposite angle with respect to the slide, whereby to maintain the cutter in a plane perpendicular to the axis of the work, or approximately so, and thus maintain its relationship with the work approximately uniform throughout its generating traverse. When cutting helical gears, a rack type cutter such as that shown at C' in Fig. 6a, having teeth at an inclination equal to that of the cutter head slide is substituted for the spur gear cutter C shown in other figures.

Backing off of the cutter and return to the cutting path are effected by a cam 39 on the crank shaft 20 and coacting springs 45 and 46. The cam operates a bell crank lever 40 to which is connected a rod 41 projecting toward the holder 11 and engaging a wear piece 42 therein. The cam through this linkage forces the holder 11 outwardly until stop shoulders 43 thereon (Fig. 14) engage abutments 44 on the base 13. Said stop shoulders are lugs or flanges projecting laterally from the side edges of the holder 11, and the abutments 44 are pieces bolted to the outer face of the base 13 near the lower end of the holder 11, located and formed to overlap the shoulders 43. Spring 45 reacts between base 13 and the head of a stud secured to the holder, tending constantly to retract the cutter; and spring 46 reacts between lever 40 and a stationary part of the carriage structure, causing the lever and transmission rod to recede when permitted by the cam 39.

The cutter carriage 14 is mounted on a slide 47 which is supported on the base 5. The carriage 14 has a rib 48 slidingly fitting a guideway in the slide extending perpendicular to the length dimension of the cutter, and a micrometer screw 49 is mounted rotatably in the slide in mesh with a nut 50 in the carriage for locating the cutter at the correct distance from the axis of the work piece. Any one of various means may be used for indicating and determining the position of the cutter, one such means being illustrated in Fig. 5 as a scale of graduations 51 on the head of the adjusting screw 49 coacting with a stationary index on the base.

Figure 7:
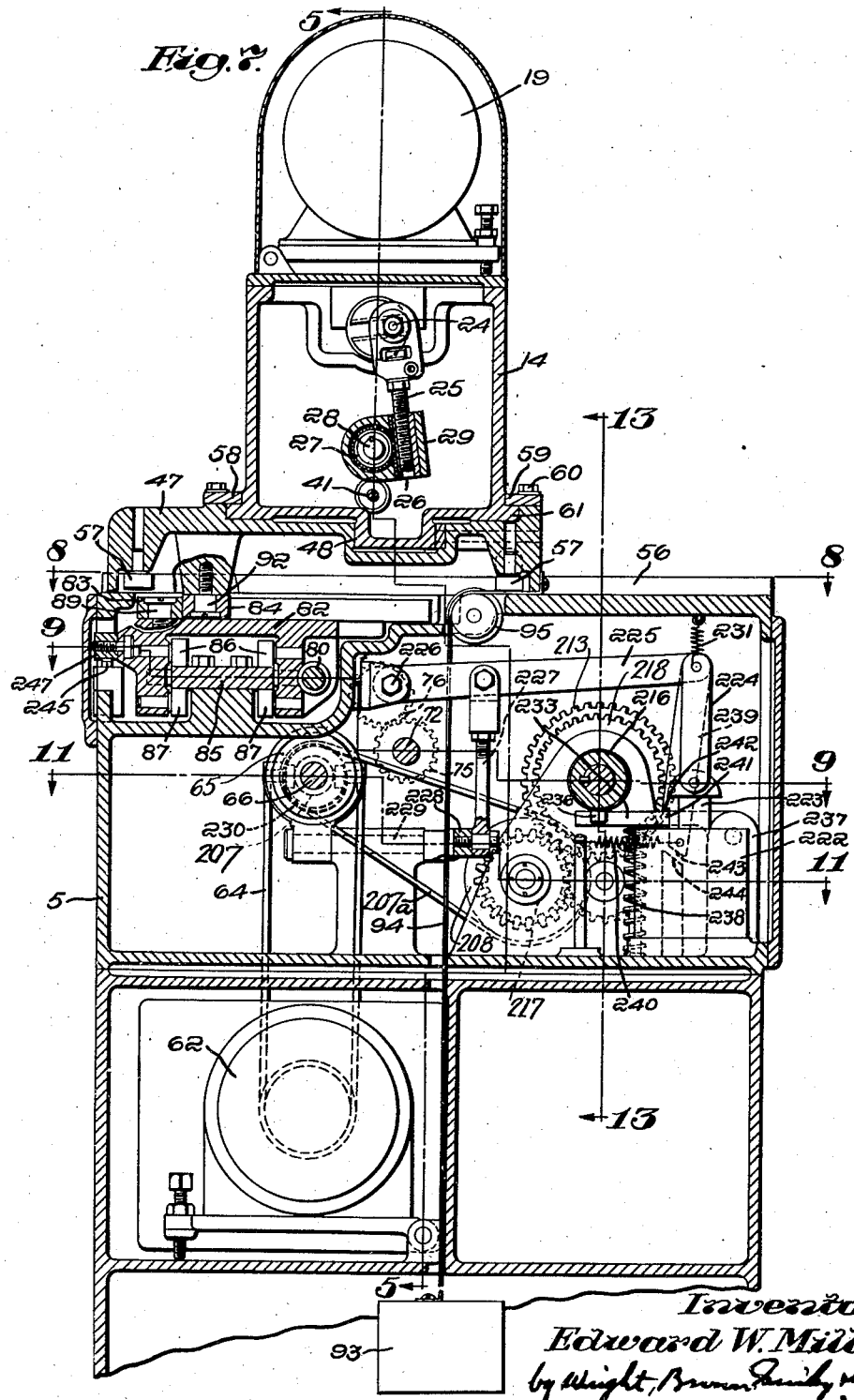
Fig. 7 is a vertical cross section taken on line 7—7 of Fig. 5.
Figure 8:
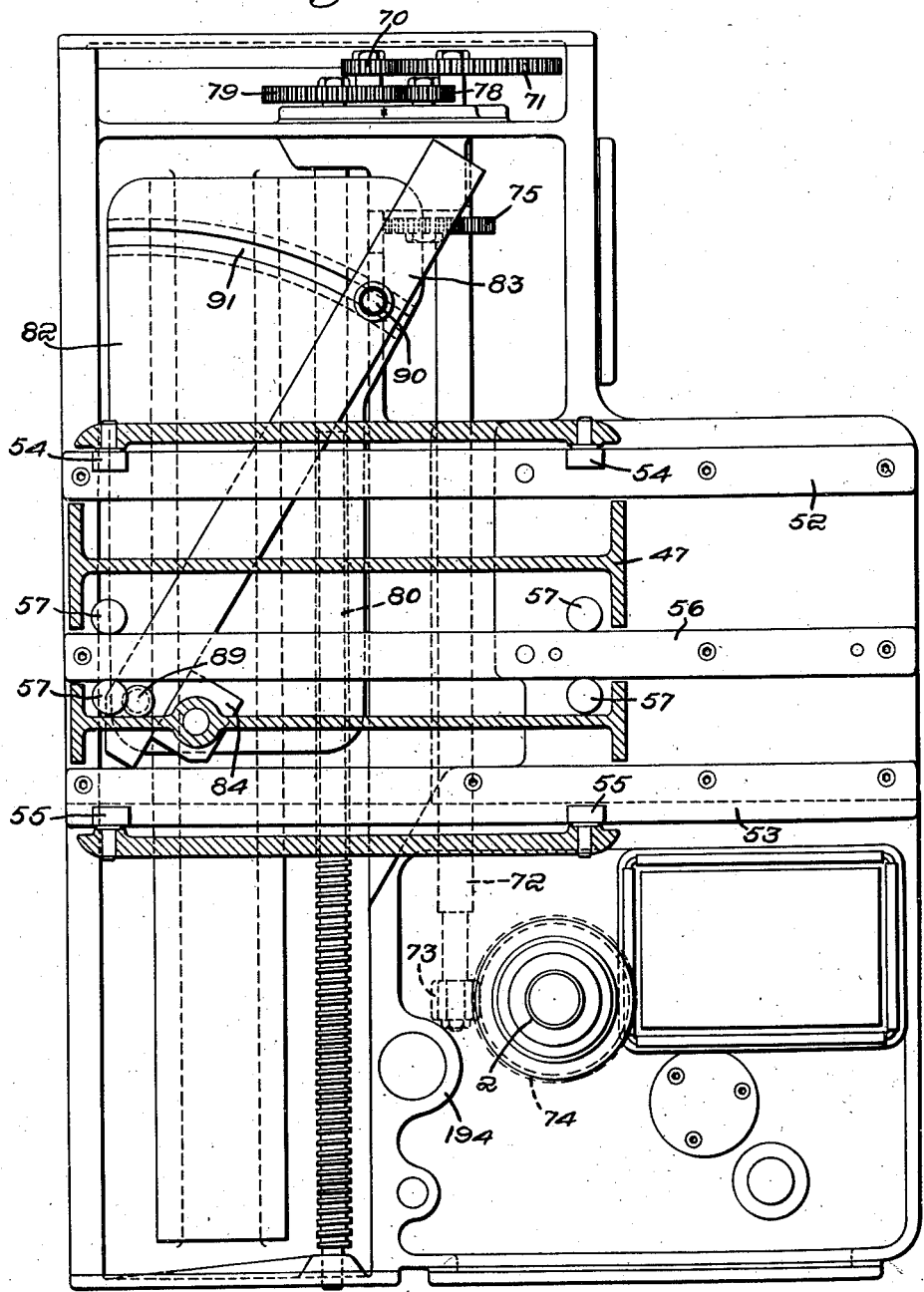
Fig. 8 is a sectional plan view taken on line 8—8 of Figs. 5 and 7.

Generation of tooth forms in the work by the process according to which this machine operates requires that the cutter be moved lengthwise in a path parallel to the pitch line of its teeth at a rate exactly equal to the linear movement of the cooperating pitch circle of the simultaneously rotating work piece. To permit of such travel, the slide 47 is supported on tracks 52 and 53 on the base, having rollers 54 and 55 which rest on said tracks; and it is guided by a rib 56, secured to the base parallel to the prescribed path of movement, which is embraced by two pairs of rollers 57 on the slide (Figs. 5, 7 and 8). The track 53, which is situated near the cutter, is undercut and a roller 58 on the carriage extends under it to hold the slide and carriage firm against the reaction of the cutter, which cuts during its downward stroke. The carriage 14 is prevented from being lifted away from the slide at such times by clamp bars 59 which are forced by bolts 60 to clamp the flanges 61 of the carriage against the underlying portions of the slide. Such clamp bars also assist the adjusting screw 49 in maintaining the cutter at the prescribed distance from the work axis.

The drive for moving slide 47 and rotating work spindle 3 is taken from a motor 62 in the base, which may be called the feed motor. This motor drives, by means of a sprocket 63 and chain 64, a sprocket 65 on shaft 66. Shaft 66 is coupled by clutch elements 67 and 68 (see also Figs. 2, 9, 10 and 11) with an alined shaft 69 connected by change gears 70 and 71 with a shaft 72 which carries a worm 73 meshing with a worm wheel 74 on the work spindle 3.

A gear 75 on shaft 72 meshes with a gear 76 on a short shaft 77 above it, which shaft also carries a gear 78 meshing with a gear 79 on a screw shaft 80. The threaded part of the screw shafts fits in a nut 81 connected with a carriage 82 on which is mounted a bar 83 (Fig. 8) engaging an abutment 84 on the slide 47. Carriage 82 travels in a path transverse to that of slide 47 and the bar 83 may be set at various angles to the path of its travel, whereby movement of the carriage causes the slide to travel at a rate proportional to the tangent of the angle at which the bar is set.

For convenient definition the bar 83 may be called a wedge or cam bar because it acts as a wedge or cam, and the carriage 82 the wedge bar carriage or slide. This carriage is supported and guided in a fixed path by a track 85 secured to the machine base, and the margins of the track are engaged on both upper and lower sides by rollers 86 and 87, while its bounding edges are embraced by rollers 88, all of said rollers being mounted on the carriage. The pivotal connection of the wedge bar with its carriage is made near one of its ends by a stud 89. It is secured at various angularities by a bolt 90 of which the head occupies an undercut arcuate slot 91 in the carriage 82 concentric with the pivot 89. The abutment 84 is a block connected to slide 47 by a stud 92 (Fig. 7), on which it has a pivotal mounting. A weight 93 connected to the slide 47 by a tape or cord 94 passing over a guide pulley 95 holds the abutment against the wedge bar and causes the carriage to move in one direction when the wedge bar is withdrawn, as well as permits the carriage to move in the other direction by the pressure action of the wedge bar in advancing. The gears 78 and 79, as well as 70 and 71, are changeable. Substitution for one another of gear pairs having different ratios, in connection with angular adjustments of the wedge bar, enable the travel of the cutter to be correlated with work gears of all diameters within the range of the machine. Due to the wedge bar, this may be accomplished with use of a relatively small number of different gear pairs.

It will be seen that the mechanism herein described effects a uniform rate of travel of the cutter tangentially of the work and a very exact correlation of the pitch line velocities of cutter and work. The transmission mechanism in the base is massive and rigid, and both the wedge carriage and the slide on which the cutter carriage is mounted are accurately guided by non-yielding means. Hence the movements of the cutter between different points of its cycle of movements are smooth, even and regular. The rack type of cutter can be made with finer teeth than cutters of other types and within closer limits of accuracy in the fine pitches. I have found it feasible to make accurate cutters with teeth finer than 150 diametral pitch and approaching 200 pitch. The type of cutter together with the means by which it is traversed cooperate to generate fine teeth by the molding process, a result which has never been accomplished heretofore in connection with gears of such fine pitches, and such gears are produced with an accuracy of spacing, form and dimensions never heretofore obtained.

Other means than the wedge bar carriage and wedge bar may be employed for imparting generating travel of the cutter. One such alternative means is shown in Figs. 18–21 inclusive. Here a cam 96 having an acting surface of involute curvature is supported to rotate in a horizontal plane above the base in contact with an abutment 97 carried by the slide 47 on a pivot stud 98. The cam is rotated in harmony with the work spindle by mechanism later described, and transmits linear movement to the carriage 47 proportional to the extent of its angular movement.

The proportional rate of the carriage movement may be altered by turning the abutment about the center of pivot 98 so as to alter the angle of its plane abutment face 99 to the direction of movement of the carriage. Setting of the abutment face to a prescribed inclination may be effected by inserting gauge blocks between a pin 100 mounted on a bracket 101 (which forms part of the carriage) and a pin 102 on an extension arm 103 of the block. Adjusting screws 104 and 105 in the bracket 101 and a second bracket 106 respectively serve to shift the abutment and secure it in its different positions of adjustment.

The involute cam and abutment 97 form in effect one tooth of a rack and pinion couple. If the abutment face is perpendicular to the path of the slide, the slide is moved at the same linear rate as the base circle of the involute, but when the abutment is inclined (by counter-clockwise rotation with reference to Fig. 20), the cam then moves the slide with the linear velocity of a pitch circle larger than the base circle.

In the main, the machine shown in Figs. 19–21 is like that first described, but it has a somewhat different transmission mechanism, with a larger number of changeable gears, for rotating the cam and work spindle. It also exhibits a modification of the means for mounting the cutter head and controlling the relief and return movements of the cutter. Parts which are substantially identical in the two forms of machine are designated by the same reference characters, while similar parts are designated by the same characters modified by exponents.

The cam is secured to a shaft 107 (Fig. 21) which is driven from a feed motor corresponding to the motor 62 by a chain engaging the sprocket 65a which, through a train of change gears shown collectively at 108, drives a shaft 69a coupled by a clutch 67a with a shaft 72a. The latter is coupled by a train of change gears shown at 109 with a shaft 110 carrying a worm 111 in mesh with a worm wheel 112 secured to shaft 107. The shaft 72a drives, through a pinion and crown gear couple 113, a worm 73a meshing with the worm wheel 74 on the work spindle.

Returning to the cutter of this machine, the cutter head 8 is secured to a plate 11a pivoted by means of a pin 12a between lugs 114 (Fig. 18) on the slide 9a which has a sliding engagement with the bed 13 by interlocking undercut guides. The rod 41a for controlling the backing off movement of the cutter is located in the tubular rock shaft 28a and carries an anti-friction roll 115 engaging an inserted wear piece 42a secured to the plate 11a by a threaded stud and nut as shown.

A further alternative means for traversing the cutter is shown in Figs. 27, 28 and 29. Here the slide 47a supporting the cutter carriage 14 is propelled directly by a screw 80a which extends in the direction of carriage travel and is driven from the shaft 72b through a gear train 116, 117, 118, 119, 120 and 121; the latter gear being secured to the screw, and the gears 118, 119, and 120 being mounted on intermediate shafts and being interchangeable with others of different ratios. The shaft 72b drives the work spindle through a worm 73 and worm wheel 74 as first described and is itself driven by essentially similar mechanism to that shown in Figs. 5–11 for driving the shaft 72.

Screw 80a engages a nut 122 on the slide and is movable endwise in its bearing 123 on the base. It is equivalent to a wedge or cam, because, when rotated, its thread acts with wedging effect on the carriage, wherefore it may be so called. A bell crank lever having two arms 124 and 125 is pivoted by a stud 126 to the base. Arm 124 is forked to embrace the shaft of the screw, and carries pins 127 projecting between collars 128 on the shaft. The other arm, 125, of the lever carries a pivoted block 129 on its extremity entering a guideway 130 in a bar 131, which likewise is a wedge or cam, and is pivoted by a stud 132 to the slide 47a and is adapted to be swung about its pivot from a position parallel to the screw and the path of movement of the slide to other positions in which it is more or less inclined to such path. It may be set at any prescribed inclination with the aid of gauge blocks, one of which is shown at 132a interposed between pins 133 and 134 mounted respectively on the end of the bar and on an adjacent part of the slide; and may be clamped in adjusted position by a screw 135 passing through a slot in the slide into threaded engagement with the bar. As the slide travels, and if the bar 131 is inclined, the bell crank lever moves the screw endwise more or less, depending on the degree of inclination of the bar 131, thus giving an increment of movement to the slide additional to that imparted by rotation of the screw. When the guideway in the bar is parallel to the path of the slide, no such incremental movement is imparted. The adjustment of the guide bar, together with substitutions for the changeable gears, enables the traversing movement of the cutter to be exactly correlated with the rotational movement of gear blanks of any diameter within the range of the machine. In other respects the form of the invention just described is like that first described.

The same ultimate effect may likewise be obtained by imparting incremental rotation to the screw 80a. A means for doing this is shown in Figs. 30 and 31, in which the screw is engaged with the slide 47a in the manner previously described, but is withheld from endwise movement by collars 145 and 146 embracing its fixed supporting bearing 123. The shaft 72c which drives the work spindle through worm and wheel gearing as previously described, is coupled with a shaft 147 by changeable gears 148, 149. Shaft 147 carries one member 150 of differential gearing, the other members of which are a gear 151 on a shaft 152 in line with shaft 147, and intermediate gears 153 and 154 in a rotatable carrier 155. Shaft 152 is connected with the shaft of screw 80a by changeable gears 156 and 157.

The gear carrier 155 is provided with worm gear teeth 158 meshing with a worm 159 which is driven by shaft 72c by a gear pair 160, shaft 161 and a train of changeable gears 162, 163, 164 and 165. By rotating the carrier 155, a speed differential is introduced in the drive from shaft 147 to shaft 152, which can be varied by substitutions in the gear train 162—165. When any of the gears of this train is removed, the carrier is held stationary by worm 159. The incremental movement which may be thus imparted to the screw supplements the effect of changing the other gears to meet all conditions.

A single machine embodying this invention is capable of producing gears of a wide range of dimensions from pinions $\tfrac{1}{16}''$ or less to gears 1" or more in diameter, and of a variety of types and thickness or length in the axial dimension. They are cut to finished dimensions with great rapidity, particularly those of the smaller sizes. In order to facilitate changing of the work which, if performed manually, would in many instances require more time than the entire cutting cycle, the machine is provided with a magazine for holding blanks and automatic means for transferring the blanks to the work spindle, with simultaneous ejection of finished work pieces, and clamping them on the spindle. I will now describe the embodiment of magazine, work holder and mechanism for operating them in timed relationship disclosed in the drawings.

Figs. 15, 16 and 17 show the details of one form of magazine. This is designed to accommodate gear blanks in the form of thin disks which are strung on an arbor 1 having a base flange 166 and a pin 167 for preventing rotary shifting of the disks with respect to one another. This magazine is made of separable parts 168 and 169 secured together by screws 170 and having an internal space of suitable dimensions to receive the gear blank and arbor assemblages in a row side by side. These parts have ribs on one edge collectively forming a dovetail 171 which fits adjustably, and is clamped, in a groove 172 of a magazine holder 173 by screws 174. An adjusting screw 175 mounted in the holder is provided with a flange entering a groove in the rib 171 to aid in exactly locating the magazine with respect to the work spindle.

A pusher 176 is contained slidingly in the slot or guideway 177 provided between the outer lips of the two parts of the magazine and is connected with a spring metal tape 178 like the springs used in watches and clocks, which extends along the inner wall of the magazine and around a guide roll 179 to a shaft 180 to which its other end is secured and around which it is coiled under tension. The effect of the spring is to move the pusher and advance the blanks toward and out of the end of the magazine nearest the work spindle when permitted by withdrawal of blanks. The pusher may be retracted manually toward the outer end of the magazine, having a projection for engagement by the operator's finger for that purpose, to permit loading. A retainer 181 is connected to the discharge end of the magazine by a pivot 182. It has two separated hooks 183 arranged to embrace the blanks and engage the extremities of the arbor 1 of the endmost assemblage. The retainer and its hooks are so located by an adjustable stop screw 184 and opposing spring 185 acting on a lug 186 which projects from the retainer between the screw and spring, that the outermost blank is clear of the magazine but is held firmly in engagement with the hooks by pressure transmitted through the other blanks from the pusher. The engaging edges of the hooks slightly overlap the blank arbor 1 at such a small angle to the path of that end of the magazine in moving toward and away from the work spindle that they are displaced by the arbor against the yielding resistance of spring 185 when the magazine withdraws from the work spindle after the latter has taken the blank.

Different magazines like or equivalent to that above described are provided for holding blanks of different types and dimensions and may be mounted interchangeably on the holder 173.

Said magazine holder is mounted on a splined shaft 187, having a divided hub fitting the shaft and being clamped on the same at the proper height with respect to the work spindle by screws 188. Said shaft is suitably located, and the magazine suitably adjusted, to enable the outermost blank to be brought into alinement with the work spindle axis (indicated by the letter A in Fig. 15) by partial rotation of the shaft.

An ejector 189 in the spindle (Figs. 5, 6 and 22) and the arbor support or clamp 6 previously described are operated in time with the movements of the magazine to release a completed work piece and pick off the blank presented by the magazine. The ejector is mounted for endwise movement within the work spindle and work adapter 2, and its lower end is engaged by an operating lever 190. The arm 7 which carries the arbor support is, as best shown in Figs. 22 and 23, attached to a bracket 191 which is secured, with provision for adjustment as to height, by a clamp 192, on an endwise movable bar or shaft 193. Shaft 193 passes through a guideway 194 in the base and is engaged with an operating lever 195. The bracket 191 is also engaged slidingly with a parallel guide bar 196 which is fitted tightly in a socket 197 and serves to maintain the alinement of the arbor support with the work spindle. Members 198 carried by the bracket, and one of which is adjustable to take up wear and looseness, embrace the guide bar.

The foregoing description is made with reference to the specific machine embodiment of Figs. 18-23. In the form illustrated in Figs. 1-13, the bracket 191a and guide bar 196a differ slightly in form and position, but in all essential respects are like the form of Figs. 18-23 and correspond with the foregoing description.

The operating levers 190 and 195 are actuated respectively by cams 199 and 200 on a shaft 201. Said shaft drives by means of a gear couple 202 (Fig. 13) a shaft 203 carrying a cam 204 (Fig. 9), which acts on a lever 205 secured to the magazine carrying shaft 187. A spring 206 (Fig. 21 is shown as holding the lever against the cam. It may be understood without specific illustration, that suitable springs may be provided to supplement gravity in lowering the work ejector and arbor support.

Figure 9:
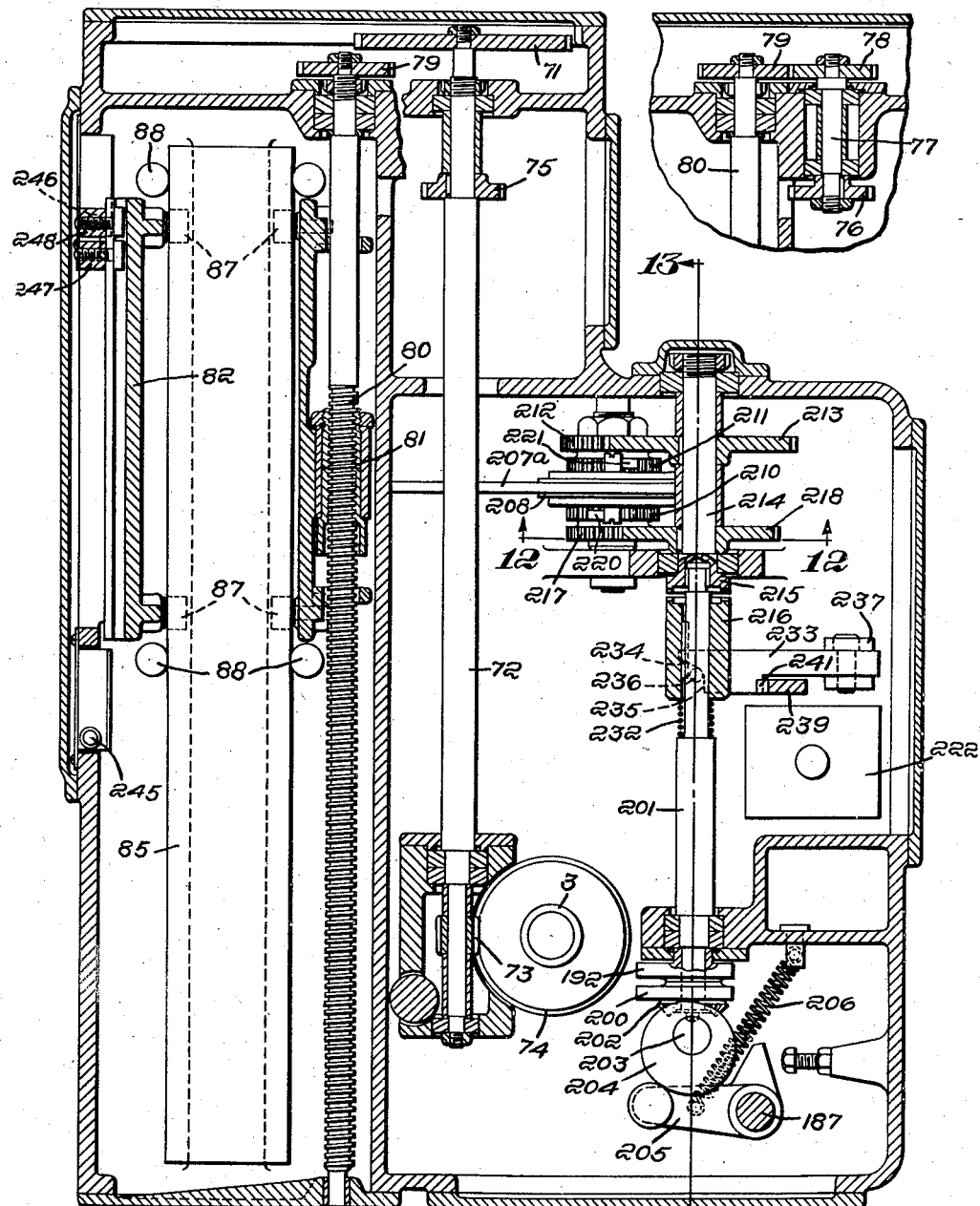
Fig. 9 is a horizontal cross section taken on line 9—9 of Figs. 2 and 7.
Figure 10:
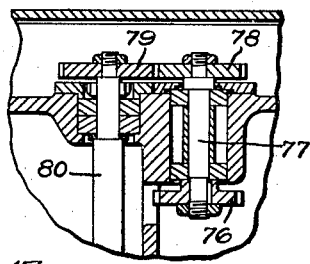
Fig. 10 is a fragmentary horizontal section taken on line 10—10 of Fig. 2.

The cam shaft 201 is driven by the feed motor 62 by a sprocket 207 (integral or otherwise connected with sprocket 65), chain 207a and sprocket 208 loose on the shaft 209 (Fig. 11). Two ratchet wheels 210 and 211 are keyed to shaft 209. The ratchet wheel 211 is connected with a gear 212 in mesh with a gear 213 which is keyed to a shaft 214 (Fig. 9). The latter shaft is in line with the cam shaft but is rotatable independently and is put in driving connection with it at prescribed times by normally disconnected clutch elements 215 and 216. The ratchet 210 is connected with a gear element 217 which drives shaft 214 through a gear 218 thereon and an intermediate gear 219 (Fig. 11). Pawls 220 and 221 carried by the sprocket 208 coact with the ratchets 210 and 211 respectively. These pawls and ratchets constitute overrunning or one way clutches of which the clutch 221—211 drives the shaft 214 when the sprocket rotates clockwise (with respect to Fig. 12) and the clutch 220—210 drives the shaft when the sprocket rotates counter-clockwise. The feed motor is reversible and runs in alternately opposite directions to cause gear generation during traverses of the cutter both from left to right and from right to left. Due to the overrunning clutches and the two driving trains, one of which contains one more gear than the other, the shaft 214 is rotated always in the same direction.

The cycle of the machine comprises traverse of the cutter in one direction and rotation of the work spindle through an angle sufficient to cut one gear; arrest of the generating movements while the work is changed; rotation of the cam shaft 201 to release the finished work piece and substitute a new blank; arrest of the cam shaft and traverse of the cutter in the opposite direction with correspondingly reversed rotation of the work spindle; stoppage of the reversed generation; and operation of the cam shaft to substitute another blank for the last finished work piece. The steps of the cycle are effected by connecting and disconnecting the clutches 67—68 and 215—216 performed by a solenoid 222 under control of the wedge bar carriage 82.

The core 223 of the solenoid (Fig. 7) is coupled by a link 224 with a lever 225 pivoted at 226 to a bracket in the base. Lever 225 is coupled by a link 227 with an arm 228 secured to a rock shaft 229 to which also is secured a forked arm 230 embracing and coupled to the slidable clutch element 67 which is splined to shaft 66. In the normal position of these parts, when the solenoid is inactive, the core of the solenoid is raised and the clutch element 67 engaged with the complemental clutch element, by a spring. The spring for this purpose may be applied to any part of the linkage, and it is shown diagrammatically in Fig. 7 as connected between the top of the base and lever 225 at the location 231.

The clutch element 216 is splined to shaft 201 and is pressed toward the other clutch element by a spring 232. It is normally held out of engagement by a stop 233 having a wedge surface 234 (Fig. 9) and an arresting shoulder 235 coacting with a pin 236 which projects from the clutch member 216. The stop 233 is pivoted to a bracket 237 which permits it to move toward and away from the clutch member but holds it rigid against movement parallel to the axis of the clutch. A spring 238 (Fig. 7) normally holds the stop against the side of the clutch member in the path of the stop pin 236, and returns it thereto after being displaced. A trip 239 is carried by lever 225 or link 224 (conveniently by the pivot connecting these parts) beside the stop and is forced by a spring 240 against a shoulder 241 on the side of the stop. Said trip is made with a shoulder 242 overlying the shoulder 241 and with an inclined face 243 at its lower end adjacent to the inclined face of a stationary wedge member 244.

While the solenoid is inactive, the stop and trip are in the positions shown in Figs. 7 and 9. When the solenoid is energized, the lever 225 is lowered, simultaneously uncoupling the clutch 67 and displacing the stop 233, which permits clutch element 216 to engage the complemental member 215, whereby it is started in rotation. In the course of its continuing movement and immediately after the stop has been withdrawn, the trip 239 engages the wedge member 244 and is thereby caused to release the stop, which is returned by its spring 238 into position for uncoupling clutch 216 and arresting the cam shaft by means of the pin 236 when the shaft has completed one rotation.

The solenoid is controlled by two limit switches 245 and 246 (Figs. 7 and 9) in its circuit which are operated by dogs 247 and 248 adjustably mounted in a well known manner in the side of the wedge bar carriage 82.

The cycle just described is that of the machine embodiment illustrated in Figs. 1–14 inclusive. That of Figs. 18–21 includes an automatic inoperative return of the cutter to first position after cutting a gear; but the means for stopping the generating motion and changing the work are essentially identical or equivalent.

Adjustment of the machine to accommodate blanks of different characters involves substitution of different magazines, as previously stated, and also of different work adapters and arbor supports for some classes of work. Fig. 24 shows a substituted work adapter 2a and arbor support 6a designed for holding solid pinions W' of small dimensions having protruding shanks or pivots. The adapter and support are tubular to receive the pivots. Fig. 25 shows equivalent substituted parts 2b and 6b designed for holding small gears W³ with a central hole instead of stems. The adapter and work support in this case are provided with pilots fitting the hole in the work piece. The adapter in either case may be provided with serrations on its extremity as shown by the enlarged detail view, Fig. 26, to indent the work and insure rotation with the spindle.

With the machine set up for normal automatic operation, the cutter is located so that the path in which the generating travel takes place intersects the margin of the work piece on the work spindle to the full prescribed cutting depth. Before commencement of the cycle it is wholly at one side of the front-to-rear plane through the spindle axis and far enough from such plane to place its nearer end clear of the work piece, and its travel is made greater than its length by a distance sufficient to carry its trailing end similarly clear of the work; whereby room is given for mounting of blanks and removal of finished pieces after each traverse of the cutter. There is no depth feed in the direction perpendicular to such travel, and when once the cutter has been set by the adjuster 49 in a line which passes the work spindle axis at the correct center distance therefrom, the center distance is not changed so long as gears of the same diameter are being cut with the same cutter, except as may be needed to compensate for sharpening of the cutter.

The cutter contains at least as many teeth as are to be cut in a given gear; and may have two or more times as many to provide for cutting in a plurality of stages.

Machine elements analogous to gears in possessing protruding portions and intermediate recesses capable of being generated by appropriate conjugate cutters in the manner herein described, such as sprockets, cams, etc., may be cut by machines embodying this invention. In other words, the protection which I seek is not restricted to the cutting of gears alone, but includes analogous applications of the principles herein described. Furthermore, the invention includes all novel principles of means and combinations without limitation as to dimensions or proportions or the dimensions of the pieces on which they are provided to perform operations.

The parts of the foregoing description which state or imply certain definite relations of parts of the machine to the horizontal plane are not to be construed as limitations of the invention, except in so far as concerns the novelty and advantage of a magazine holding blank work pieces in horizontal alinement. In general the parts of the machine may have any desired relation to the horizon; but there is an advantage in mounting the magazine so that the weight of the work pieces is to a factor in their passage through the magazine and delivery to the work spindle. This enables small pieces to be handled just as efficiently as larger ones that weigh much more. The combination of horizontal magazine with vertical spindle enables the work to be presented over the spindle with its axis vertical, making it a simple matter to aline the work accurately with the spindle.

The word "transverse" as used in this specification and in the following claims includes situations in which the part or movement characterized by that term is inclined to the reference part or direction as well as those in which it is perpendicular to such reference part or direction.

What I claim and desire to secure by Letters Patent is:

1. A machine for generating and cutting gears, cams, and other articles analogous thereto comprising a rotatable spindle on which the work piece is mounted, an elongated cutter having its cutting portion extending along one margin thereof, such cutting portion being conjugate to the prescribed formation to be generated in the work piece and of a length at least as great as the circumference of the work piece, and means for propelling the cutter progressively and continuously in the direction of its length dimension in a path tangent to a given circle concentric with the work spindle axis, at the same rate of movement as the circumference of said given circle and through a distance as great as the circumferential length of the work to be performed; said means comprising changeable gearing for correlating the linear speed of the cutter to work pieces of larger or smaller peripheries, and auxiliary adjustable means for imparting an increment of movement to the cutter in addition to that caused by said gearing.

2. A machine for generating and cutting gears, cams, and other articles analogous thereto comprising a rotatable spindle on which the work piece is mounted, an elongated cutter having its cutting portion extending along one margin thereof, such cutting portion being conjugate to the prescribed formation to be generated in the work piece and having a length substantially as great as the circumferential extent of the portion of the work piece to be acted on, a slide supporting the cutter constrained to move in a straight path transverse to and at one side of said spindle, the cutter being mounted with its length dimension substantially parallel to said path and its cutting portion in a zone which intersects the peripheral portion of the work piece, means for simultaneously advancing said slide progressively in one direction only and rotating said spindle in the same direction as to its side next to the cutter, at harmonious speeds, said means including changeable gearing for correlating the linear speed of the slide to circumferences of greater or less length around the axis of the spindle, and auxiliary adjustable means for imparting an increment of movement to the slide in addition to that effected by said gearing and means for reciprocating the cutter in a plane substantially parallel to the spindle and in directions transverse to the length of the cutter for the purpose of performing the cutting action.

3. A machine as and for the purpose set forth comprising a rotatable work spindle, a slide guided to travel in a straight path transverse to the spindle, a bar-like cutter supported on the slide having cutting portions in a line substantially parallel to the direction of movement of the slide and at one side of the spindle axis, means for reciprocating said cutter in a plane substantially parallel to the spindle axis and in a direction transverse to the length of the cutter for performing the cutting action, means for changing the distance between the cutter and the plane which passes through the axis of the spindle and is parallel to the path of the cutter, and adjustable driving mechanism coupled to the spindle for rotating it and including a machine element acting on the slide for moving it translatively in the same direction as the nearer side of the spindle; said mechanism being adjustable to make the speed of travel of the cutter equal to the linear speed of a circumference concentric with the spindle axis and predetermined as the pitch circle radius of a given work piece.

4. A machine as and for the purpose set forth comprising a rotatable work spindle, a slide guided to travel in a straight path transverse to the spindle, a bar-like cutter supported on the slide having cutting portions in a line substantially parallel to the direction of movement of the slide and at one side of the spindle axis, means for reciprocating said cutter in a plane substantially parallel to the spindle axis and in a direction transverse to the length of the cutter for performing the cutting action, means for altering the distance between the cutter and the plane which passes through the axis of the spindle and is parallel to the path of the cutter, and adjustable driving mechanism coupled to the spindle for rotating it and for propelling the slide in harmony with the spindle, including a cam element acting on the slide for moving it translatively in the same direction as the nearer side of the spindle constructed to impart movement to the slide proportional to its own movement.

5. A machine as and for the purpose set forth comprising a rotatable work spindle, a slide guided to travel in a straight path transverse to the spindle, a bar-like cutter supported on the slide having cutting portions in a line substantially parallel to the direction of movement of the slide and at one side of the spindle axis, means for reciprocating said cutter in a plane substantially parallel to the spindle axis and in a direction transverse to the length of the cutter for performing the cutting action, means for effecting a relative adjustment between the cutter and spindle in a manner to alter the distance of the cutter from the plane which passes through the axis of the spindle and is parallel to the path of the cutter, and adjustable driving mechanism coupled to the spindle for rotating it and for propelling the slide in harmony with the spindle, including a rotatable cam driven at a prescribed speed ratio with respect to the speed to rotation of the spindle, and an abutment carried by the slide engaged with the cam, the cam being formed and located to impart equal increments of linear motion to the slide with equal increments of its own angular motion.

6. A machine as and for the purpose set forth comprising a rotatable work spindle, a slide guided to travel in a straight path transverse to the spindle, a bar-like cutter supported on the slide having cutting portions in a line substantially parallel to the direction of movement of the slide and at one side of the spindle axis, means for reciprocating said cutter in a plane substantially parallel to the spindle axis and in a direction transverse to the length of the cutter for performing the cutting action, adjusting means for causing the path of the cutter and the axis of the spindle to be located at a predetermined distance apart, and adjustable driving mechanism coupled to the spindle for rotating it and for propelling the slide in harmony with the spindle, including a rotatable cam driven at a prescribed speed ratio with respect to the speed of rotation of the spindle, and an abutment carried by the slide engaged with the cam, said cam being of involute curvature in its active portion and the abutment having a plane face which crosses a line tangent to the base circle of said involute curve and parallel to the path of movement of the slide, said abutment being adjustable to incline its face from the perpendicular relationship to various inclinations with respect to said line.

7. A machine as and for the purpose set forth comprising a rotatable work spindle, a slide guided to travel in a straight path transverse to the spindle, a bar-like cutter supported on the slide having cutting portions in a line substantially parallel to the direction of movement of the slide and at one side of the spindle axis, means for reciprocating said cutter in a plane substantially parallel to the spindle axis and in a direction transverse to the length of the cutter for performing the cutting action, means for establishing at a predetermined value the distance between the cutter and the plane which passes through the axis of the spindle and is parallel to the path of the cutter, means for rotating the spindle and for propelling the slide in harmony with the spindle, comprising a wedge bar, a carriage movable in a linear path transverse to the path of movement of said slide and on which the bar is mounted, and an abutment carried by the slide engaging one side of said bar; the bar being inclinable at different angles to its path of movement whereby to impart movement to the slide proportional to the movement of the bar carriage but at different ratios.

8. A machine as and for the purpose set forth comprising a rotatable work spindle, a slide guided to travel in a straight path transverse to the spindle, a bar-like cutter supported on the slide having cutting portions in a line substantially parallel to the direction of movement of the slide and at one side of the spindle axis, means for reciprocating said cutter in a plane substantially parallel to the spindle axis and in a direction transverse to the length of the cutter for performing the cutting action, means for changing the distance between the cutter and the plane which passes through the axis of the spindle and is parallel to the path of the cutter, means for rotating the spindle, and means for propelling the slide in harmony with the spindle comprising a cam element in the form of a screw and an abutment element in the form of a nut carried by the slide and meshing with the screw, said screw being rotated at a rate in a given proportion to the rate of rotation of the spindle.

9. A machine as and for the purpose set forth comprising a rotatable work spindle, a slide guided to travel in a straight path transverse to the spindle, a bar-like cutter supported on the slide having cutting portions in a line substantially parallel to the direction of movement of the slide and at one side of the spindle axis, means for reciprocating said cutter in a plane substantially parallel to the spindle axis and in a direction transverse to the length of the cutter for performing the cutting action, means for effecting a relative adjustment of approach and recession between the cutter and the plane which passes through the axis of the spindle and is parallel to the path of the cutter, and adjustable driving mechanism coupled to the spindle for rotating it and for propelling the slide in harmony with the rotation of the spindle; said mechanism comprising a screw, changeable gearing coupled with the screw and the spindle rotating means for driving the screw at different predetermined ratios with respect to the spindle, and a nut carried by the slide meshing with said screw.

10. A cutting and generating machine as set forth in claim 9 combined with adjustable means for giving the screw an incremental progressive movement superimposed upon that caused by said gearing.

11. A generating and cutting machine as and for the purpose set forth comprising a supporting structure, a spindle rotatably mounted on said structure, a slide translatively mounted on said structure and guided to move in a rectilinear path transverse to the spindle, a screw in geared connection with the spindle to rotate at a prescribed ratio to the rotation of the spindle and engaged with the slide to impart linear motion thereto when rotated, said screw being movable endwise, and adjustable mechanism for giving predetermined increments of endwise movement to the screw proportional to the rotational movement thereof.

12. A generating and cutting machine as and for the purpose set forth comprising a supporting structure, a spindle rotatably mounted on said structure, a slide translatively mounted on said structure and guided to move in a rectilinear path transverse to the spindle, a screw in geared connection with the spindle to rotate at a prescribed ratio to the rotation of the spindle and engaged with the slide to impart linear motion thereto when rotated, said screw being movable endwise, a guide carried by the slide and adjustable to various degrees of inclination to the path of the slide, and a lever having one arm engaged with the screw and another arm engaged with said slide, said lever being arranged to be moved angularly about its fulcrum and thereby impart translative movement to the screw as the slide advances, when said guide is inclined to the path of the slide.

13. In a gear generating and cutting machine, a cutter carriage, a cutter head base supported on said carriage with provision for angular adjustment, a rock shaft passing through the axis of adjustment of said base, a slide supported for rectilinear movement on the base, a pinion on the rock shaft and cooperating rack teeth on the slide for reciprocating the latter, a cutter head angularly adjustable with respect to said slide about the axis of the rock shaft, and a cutter in the form of a rack secured to said cutter head.

14. A machine for generating and cutting gears, cams and other analogous articles, comprising a work spindle, a cutter, means for giving said cutter reciprocative cutting movements longitudinally of the work spindle and a generating movement transverse thereto, a magazine holding uncut blanks, and means for moving the magazine at the end of a cutting cycle on one work piece to place a blank on the spindle in substitution for the finished piece.

15. A machine for generating fine tooth gears comprising a work spindle, a complemental holder in line with said spindle arranged to cooperate therewith in centering and holding a work piece for rotation with the spindle, means for rotating the spindle, a cutter, means for traversing the cutter tangentially of the spindle and reciprocating it transversely of its traversing movement for effecting the prescribed generating and cutting action, a magazine holding a succession of blanks, and correlated mechanism for separating the work holder from the spindle, and moving the magazine to place the endmost blank therein into alinement with the spindle and work holder at the conclusion of the cycle of movements for cutting a work piece.

16. A machine for generating gears, cams and other articles of similar or analogous character, comprising a work spindle, a cutter, a magazine adjacent to said spindle adapted to hold a number of blank work pieces, driving mechanism for effecting relative generating movement between the spindle and cutter, mechanism for effecting relative cutting and return movements between the cutter and spindle lengthwise of the spindle axis, mechanism for moving the magazine so as to place the endmost blank thereon in alinement with the spindle axis, and for withdrawing the magazine, mechanism correlated with the last named mechanism for causing the spindle to retain a blank when the magazine withdraws, and means for correlating the said mechanisms for causing each to operate when the other is inoperative and to become inoperative when the other operates.

17. A machine as set forth in claim 16, in which the mechanism for causing cutting and generative relative movements between the work spindle includes a shaft and a connectible and disconnectible clutch for transmitting rotary movement to said shaft, the mechanism for operating the blank magazine and blank taking means comprises a rotary shaft and a disconnectible clutch for transmitting rotation thereto, and the correlating means comprises clutch shifters organized for simultaneous operation to connect either clutch and disconnect the other.

18. A generating machine of the character set forth comprising a rotatable work spindle, a elongated cutter having a cutter edge of an outline conjugate to the form to be generated in work piece mounted on said spindle, means for effecting relative cutting and return strokes between the cutter and spindle in the general direction of the axis of the spindle, feed mechanism for effecting simultaneous rotation of the work spindle and endwise translation of the cutter in the same direction as the linear travel of the side of the spindle next to the cutter, and means for reversing said feed mechanism; said reversing means and feed mechanism being organized to transport the cutter through a distance enough greater than the linear extent of its cutting edge to carry the trailing end of the cutting edge clear of a work piece on the spindle in the course of each traverse of the cutter; combined with a magazine adapted to hold a series of blank work pieces, movable supporting means for said magazine located and operable to move that portion of the magazine which holds the endmost blank of the series into alinement with the spindle and aside from such alinement, and mechanism for so moving the magazine at the end of each linear travel of the cutter.

19. In a gear generating machine having a work spindle adapted to hold a gear blank, a cutter having cutting edges conjugate to the forms to be generated in said blank, and means for effecting correlated cutting and generating movements between said cutter and blank; a magazine constructed to hold a row of blank work pieces with their axes parallel to one another, a stop at one end of said magazine for arresting the blank at one end of the row, a spring actuated pusher acting on the blank at the opposite end of the row in a direction to press the row of blanks toward the stop, a shaft supporting said magazine at one side of the spindle with its axis equally distant from the spindle and from the axis of the blank which is positioned by said stop, and means for giving the shaft an oscillative movement through an angle sufficient to carry the stop-positioned blank from a location beside the spindle to alinement with the spindle, and return the magazine to first position.

20. In a gear generating machine as set forth in claim 19, the combination with the work spindle and blank magazine set forth in said claim, of an arbor support in alinement with said spindle and adapted to cooperate therewith in centering and holding work blanks on the spindle, and means correlated with the magazine actuating mechanism for causing said arbor support to engage and retain the blank which is brought by the magazine into alinement with the spindle.

21. In a generating machine of the character set forth, a work spindle, a work ejector centrally located in said spindle and movable endwise so as to protrude from and recede into the work supporting end of the spindle, a work clamp alined with the spindle opposite to the work supporting end thereof and spaced apart from such end, said clamp being movable toward and away from the spindle to engage and release work pieces on the spindle, a magazine adapted to hold a series of blank work pieces, supporting means for said magazine movable to place the endmost blank between the spindle and clamp, and correlated mechanism for operating said ejector, clamp and magazine to cause placement of a work blank between the ejector and clamp, engagement of such blank thereby, withdrawal of the magazine leaving such blank engaged with the ejector and clamp, and grasping of the blank between the spindle and clamp.

22. In a generating machine, the combination of a rotatable work spindle adapted to support a blank to be machined, a cutter carriage, a cutter head base secured to said carriage with provision for angular adjustment about an axis transverse to the spindle axis, a plate pivoted to the base to swing about an axis transverse to both the spindle axis and to the axis of adjustment of the base, said plate having a guideway crossing the axis of angular adjustment, a slide mounted to travel in said guideway, a cutter head secured to said slide on the outer face thereof with provisions for angular adjustment about an axis extending in substantially the same direction as the axis of adjustment of said base, and a bar-like cutter secured to said cutter head.

23. In a generating machine, the combination as set forth in claim 22 combined with driving mechanism for reciprocating the slide comprising a rock shaft coaxial with the axis of angular adjustment of said base, a gear on said rock shaft adjacent to the slide, and a series of teeth on the slide extending in a line parallel to said guideway and meshing with said gear, whereby said driving mechanism is enabled to reciprocate the slide with equal effect in all positions of angular adjustment of the base.

24. A generating machine of the character set forth, comprising a supporting structure, a slide in guided engagement with said supporting structure for movement in a given path, a work spindle and a bar like cutter, one of which is mounted on the supporting structure and the other on the slide, the axis of said spindle being transverse to the path of the slide and the cutter being located with its length parallel to said path and having cutting portions extending along its length in position to operate on a work piece mounted on the spindle, means to effect relative reciprocation between the cutter and work spindle in the direction of the spindle axis for performing the cutting action, a movable wedging element associated with the slide for propelling the latter in its prescribed path, driving mechanism coupled with the spindle and said wedging element correlated to rotate the spindle and move the wedging element at a predetermined ratio, and adjustable provisions additional to said driving mechanism for altering the ratio between the ultimate movement imparted to the slide by said wedging element and the angular movement of the spindle.

25. A generating machine as set forth in claim 24, in which the wedging element is movable in a path transverse to the path of the slide and has a surface inclined to both paths arranged to act on the slide, combined with provisions for altering the inclination of said surface.

26. A generating machine as set forth in claim 24, in which the wedging element is a rotatable cam arranged to act on the slide, and an angularly adjustable abutment carried by the slide in contact with the propelling face of the cam constitutes provisions for altering the movement ratio of the slide.

27. A generating machine as set forth in claim 24, in which the wedging element is a rotatable screw in threaded engagement with the slide, said screw being rotated at a prescribed rate by the driving mechanism, and adjustable means are provided for giving an additional movement to the screw.

28. A generating machine as set forth in claim 24, in which the wedging element is a rotatable and endwise-movable screw in threaded engagement with the slide, said screw being rotated by the driving mechanism, and there being adjustable means for imparting an endwise movement to the screw simultaneously with its rotation.

29. A generating machine of the character set forth, comprising a supporting structure, a slide mounted on said supporting structure in guided engagement therewith to travel in a prescribed path, a work spindle and a bar like cutter, one of which is mounted on the supporting structure and the other on the slide, the axis of said spindle being transverse to the path of the slide and the cutter being located with its length parallel to said path and having cutting portions extending along its length in position to operate on a work piece mounted on the spindle, means for effecting relative reciprocation between the cutter and spindle in the direction of the spindle axis for performing the cutting action, a rotatable and endwise-movable screw on the supporting structure in threaded engagement with the slide, driving mechanism coupled with the spindle and screw, correlated to impart rotation to both at a predetermined speed ratio, a guide carried by the slide, adjustably with provisions for placement at different inclinations to the path of the slide, a guided element supported independently of the slide for movement transversely of said path, engaged with said guide and displaceable thereby, and means for transmitting movement from said guided element to the screw with conversion of such movement into endwise movement of the screw.

30. A generating machine of the character set forth, comprising a supporting structure, a slide mounted on said supporting structure in guided engagement therewith to travel in a prescribed path, a work spindle and a bar like cutter, one of which is mounted on the supporting structure and the other on the slide, the axis of said spindle being transverse to the path of the slide and the cutter being located with its length parallel to said path and having cutting portions extending along its length in position to operate on a work piece mounted on the spindle, means for effecting relative reciprocation between the cutter and spindle in the direction of the spindle axis for performing the cutting action, a rotatable and endwise-movable screw on the supporting structure in threaded engagement with the slide, driving mechanism coupled with the spindle and screw, correlated to impart rotation to both at a predetermined speed ratio, a member having a guideway pivoted to the slide with provisions for adjustment to set the guideway at various inclinations, or parallel, to the path of the slide, a lever pivoted on the base having one arm engaged with the screw, and a guided element carried by the other arm of said lever projecting into said guideway; the lever being arranged to be moved by the slide through said guideway and guided element when the slide is propelled in its path and the guideway is inclined to said path, and to transmit endwise movement to the screw.

31. A gear generating machine comprising a work spindle, a cutter in the form of a rack having a number of teeth as great as the number of tooth spaces to be cut in the work with cutting edges on the ends of said teeth, means for supporting and traversing the cutter in a path which causes said teeth to travel in tangential intersecting relationship with the margin of a given work piece secured to the work spindle, a cutter head, a holder for the cutter head, means for reciprocating said holder, and provisions for shifting the path of reciprocation of said holder angularly between parallelism with the axis of the spindle and different inclinations corresponding to the helix angles of various helical gears, the cutter head being mounted on the outer side of the holder with a pivotal bearing thereon, the axis of which is substantially parallel to the axis of the angular shifting of said path, and the cutter being secured to the cutter head outside and clear of said pivotal bearing.

32. In a gear generating machine, a rotatable work spindle, a rack formed cutter having cutting edges on the ends of its teeth, a cutter carriage movable in a path at one side of and transverse to said work spindle, a cutter head base secured to said carriage adjustable angularly about an axis transverse to both said path and said work spindle, rectilinear guide means supported by said base and adapted to be placed, by adjustment of the base, in various positions which are respectively parallel and inclined to the spindle axis, a slide mounted on said guide means, and mechanism for reciprocating the slide, the cutter head being located at the outer side of said slide and having a pivotal connection therewith on an axis extending in the same direction as the axis of angular movement of the base, and the cutter being of greater length than the diameter of said pivotal connection and lying clear of the boundaries thereof.

33. In a generating machine, the combination of a rotatable work spindle adapted to support a blank to be machined, a cutter carriage, a cutter head base secured to said carriage with provision for angular adjustment about an axis transverse to the spindle axis, a holder pivoted to the base to swing about an axis transverse to both the spindle axis and to the axis of adjustment of the base, said holder having a guideway crossing the axis of said angular adjustment, a slide mounted to travel in said guideway, a cutter head secured to said slide with provision for angular adjustment about an axis extending in substantially the same direction as the axis of adjustment of said base, a bar-like cutter secured to said cutter head, means for reciprocating said slide, and means for swinging said holder about its pivotal connection with the base in timed relation with the reciprocations of the slide in opposite directions.

34. In a generating machine, the combination of a rotatable work spindle adapted to support a blank to be machined, a cutter carriage, a cutter head base secured to said carriage with provision for angular adjustment about an axis transverse to the spindle axis, a shiftable holder pivoted to the base to swing about an axis transverse to both the spindle axis and the axis of adjustment of the base, coacting abutments on the base and holder respectively arranged to limit the swinging movement of the holder toward the work spindle, said holder having a guideway crossing the axis of angular adjustment, a slide mounted to travel in said guideway, a cutter head secured to said slide with provisions for angular adjustment about an axis extending in substantially the same direction as the axis of adjustment of the base, a bar-like cutter secured to said cutter head, means for reciprocating said slide in said guideway, and means for swinging said holder about its pivot axis so as to hold said abtuments in contact during strokes of the slide in one direction and to cause separation between the abutments while the slide is moved in the opposite direction.

35. In a generating machine, the combination of a rotatable work spindle adapted to support a blank to be machined, a cutter carriage movable in a path tangential to a circle surrounding the axis of said spindle, a cutter head base secured to said carriage with provisions for angular adjustment about an axis transverse to the spindle axis, a cutter head, a shiftable holder and a slide between said base and cutter head, to one of which the cutter head is pivoted on an axis extending in substantially the same direction as the axis of adjustment of the base, the holder and slide being engaged with one another and with the base, the holder being pivoted to swing about an axis transverse to both the spindle axis and the axis of adjustment of the base, and the slide being movable in a path transverse both to the said pivot axis and the base adjustment axis, a bar-like cutter secured to said cutter head, means for reciprocating said slide in its prescribed path, and means for moving the holder about its pivot axis in time with the reciprocating movements of the slide to locate the cutter in a given path during strokes of the slide in one direction and in a different path during strokes of the slide in the opposite direction.

36. In a generating machine, the combination of a rotatable work spindle adapted to support a blank to be machined, a cutter carriage, a cutter head base secured to said carriage with provision for angular adjustment about an axis transverse to the spindle axis, a slide in supported connection with said base, provisions for guiding said slide in a path which is adapted to be placed at various angles with respect to the spindle by angular adjustment of said base, means for reciprocating said slide in any of its paths comprising a rock shaft coaxial with the adjustment of the base, a gear on said rock shaft, and a rack connected with the slide in mesh with said gear; and a cutter head secured to said slide with provisions for angular adjustment about an axis extending in substantially the same direction as the adjustment axis of the base.

37. A machine for generating gears, cams and other articles of similar or analogous character, comprising a work spindle, a work clamp supported in alinement with the spindle and being movable toward and away therefrom for engaging and releasing work pieces mounted on the spindle, a work ejector located and movable for action to dislodge a work piece from the spindle when the work clamp is withdrawn, a cutter, mechanism for effecting relative cutting and return movements between the cutter and spindle lengthwise of the spindle axis, mechanism correlated with the last named mechanism for effecting relative generating progression between the cutter and spindle transversely of the directions of said cutting and return movements, means for actuating the clamp to engage and release a work piece mounted on the spindle, means for actuating said ejector in the manner set forth, and control means organized to stop the action of said mechanisms and cause operation of said clamp and ejector actuating means at a prescribed point in the cycle of the machine.

38. In a machine of the character described, the combination with a rotatable spindle, a cutter, means for effecting relative cutting and return movements between the cutter and spindle in the general direction of the spindle axis, and means for effecting simultaneous generative rotation of the spindle and correlated movements of the cutter tangentially of the spindle axis, of a work clamp movable toward and away from one end of the spindle to cooperate therewith in grasping and releasing work pieces, means for so actuating said clamp, and correlated means for intermittently driving, respectively, the generative mechanism and the clamp operating mechanism, with actuation of each mechanism during the intermissions between actuations of the other.

39. In a machine of the character described, a rotatable spindle, a work clamp movable toward and away from one end of the spindle for grasping and releasing work pieces, mechanism including a disconnectible clutch for rotating said spindle, mechanism including a second disconnectible clutch for moving said work clamp away from and back toward the spindle, and means for actuating said clutches in cooperation to disconnect each in turn and couple the other.

40. In a machine of the character set forth, a cutter carriage, a slide guided to reciprocate in said carriage, a cutter in the form of a rack connected to said slide with its length dimensions transverse to the movement of the slide, driving mechanism for reciprocating the slide comprising a rock shaft, means for oscillating said shaft, a gear element carried by the shaft, and rack teeth carried by the slide in mesh with said gear element, and means for imparting backing off and advancing movement to the cutter in directions transverse both to its length dimension and to the reciprocating movements of the slide in correlation with the return and cutting strokes respectively of the slide.

41. A machine for generating gears, cams and other articles of similar or analogous character, comprising a rotatable work spindle, an endwise movable bar located beside said spindle, a work clamp carried by said bar in alinement with the spindle and being movable with the bar toward and away from one end of the spindle for cooperating with the latter to grasp work pieces and to release such work pieces, an ejector within the spindle movable endwise therethrough to advance toward and recede from the before named end of the spindle, and mechanism for actuating said bar and ejector in correlation to cause release and dislodgment of finished work pieces and to cause grasping of work blanks between the spindle and clamp.

42. A machine for generating gears, cams and other articles of similar or analogous character, comprising a rotatable work spindle, an endwise movable bar located beside said spindle, a work clamp carried by said bar in alinement with the spindle and being movable with the bar toward and away from one end of the spindle for cooperating with the latter to grasp work pieces and to release such work pieces, an ejector within the spindle movable endwise therethrough to advance toward and recede from the before named end of the spindle, levers pivotally mounted side by side, one of which engages the bar and the other the ejector, cams arranged to act on the respective levers, and means for rotating the cams; said cams and levers being correlated to cause movement of the bar and ejector in the same direction at substantially the same time.

EDWARD W. MILLER.